(12) United States Patent
Lakatos et al.

(10) Patent No.: US 8,425,668 B2
(45) Date of Patent: Apr. 23, 2013

(54) WASTEWATER PRE-TREATMENT AND EVAPORATION SYSTEM

(75) Inventors: Janos I. Lakatos, Mendon, UT (US); Edward Clay Slade, North Logan, UT (US); Clayton R. Carter, North Logan, UT (US); Christopher Allen Jahn, Mission Viejo, CA (US); Neil William Richardson, Salt Lake City, UT (US)

(73) Assignee: Total Water Management, LLC, Salt Lake City, UT (US)

( * ) Notice: Subject to any disclaimer, the term of this patent is extended or adjusted under 35 U.S.C. 154(b) by 136 days.

(21) Appl. No.: 12/965,621

(22) Filed: Dec. 10, 2010

(65) Prior Publication Data

US 2011/0140457 A1 Jun. 16, 2011

Related U.S. Application Data

(60) Provisional application No. 61/285,901, filed on Dec. 11, 2009.

(51) Int. Cl.
*B01D 45/00* (2006.01)

(52) U.S. Cl.
USPC ............ 95/267; 95/241; 95/243; 95/253; 95/260; 95/266; 210/639; 210/703; 210/800; 210/513; 210/540

(58) Field of Classification Search ............ 95/267, 95/241, 243, 253, 260, 266; 210/639, 703–707, 210/718, 723, 729, 737, 749–766, 800–804, 210/259, 167.07, 513–540; 159/48.2, 3, 159/48.1, 4.01; 290/1 R
See application file for complete search history.

(56) References Cited

U.S. PATENT DOCUMENTS

| | | | |
|---|---|---|---|
| 1,502,911 A | | 7/1924 | Doern |
| 2,268,871 A | | 1/1942 | Hall |
| 2,825,680 A | | 3/1958 | Stutz |
| 3,703,917 A | | 11/1972 | Mundy |
| 3,771,289 A | | 11/1973 | Skoli et al. |
| 3,780,786 A | | 12/1973 | Pacault et al. |
| 3,939,036 A | * | 2/1976 | Erwin ................... 159/47.1 |

(Continued)

FOREIGN PATENT DOCUMENTS

| | | |
|---|---|---|
| EP | 1 621 520 | 2/2006 |
| JP | 6-218357 | 8/1994 |
| JP | 7-88469 | 4/1995 |
| JP | 2006-7097 | 1/2006 |

OTHER PUBLICATIONS

PCT/US2010/059941, Dec. 10, 2010, International Search Report dated Aug. 12, 2011.
PCT/US2010/059941, Dec. 10, 2010, Written Opinion dated Aug. 12, 2011.

(Continued)

*Primary Examiner* — Jason M Greene
*Assistant Examiner* — Dung H Bui
(74) *Attorney, Agent, or Firm* — Workman Nydegger

(57) ABSTRACT

A fluid evaporation system includes a housing bounding an airflow path. A misting system is positioned within the airflow path for spraying a wastewater into the airflow path. Water in the misted wastewater is evaporated, thereby concentrating minerals in the wastewater. A pretreatment system is positioned upstream from the fluid evaporator. The pretreatment system includes a gas induced separator. Separation of hydrocarbons and water are enhanced using a polymer and/or by lowering the pH of the wastewater.

16 Claims, 14 Drawing Sheets

U.S. PATENT DOCUMENTS

| | | | |
|---|---|---|---|
| 4,473,438 A | 9/1984 | Loureiro | |
| 4,479,486 A | 10/1984 | Manning et al. | |
| 4,534,828 A | 8/1985 | Erickson et al. | |
| 4,564,457 A * | 1/1986 | Cairo et al. | 210/744 |
| 4,713,172 A | 12/1987 | Horn et al. | |
| 5,080,802 A | 1/1992 | Cairo, Jr. et al. | |
| 5,082,525 A | 1/1992 | Travis | |
| 5,156,745 A | 10/1992 | Cairo, Jr. et al. | |
| 5,209,821 A | 5/1993 | Shaw et al. | |
| 5,227,018 A | 7/1993 | Bro et al. | |
| 5,240,560 A | 8/1993 | Gregory | |
| 5,272,820 A | 12/1993 | Ito et al. | |
| 5,335,728 A | 8/1994 | Straham | |
| 5,381,742 A | 1/1995 | Linton et al. | |
| 5,516,434 A | 5/1996 | Cairo, Jr. et al. | |
| 5,573,661 A | 11/1996 | Rachak | |
| 5,582,680 A | 12/1996 | VanKouwenberg et al. | |
| 5,591,347 A | 1/1997 | Cairo, Jr. et al. | |
| 6,187,206 B1 * | 2/2001 | Bernier et al. | 210/721 |
| 6,190,498 B1 | 2/2001 | Blagborne | |
| 6,200,428 B1 | 3/2001 | VanKouwenberg | |
| 6,272,876 B1 | 8/2001 | Roberts et al. | |
| 6,637,379 B2 | 10/2003 | Hays et al. | |
| 7,251,939 B2 | 8/2007 | Walker | |
| 2002/0178723 A1 | 12/2002 | Bronicki et al. | |
| 2004/0086816 A1 | 5/2004 | Manning et al. | |
| 2005/0194323 A1 | 9/2005 | Ruth et al. | |
| 2006/0000355 A1 * | 1/2006 | Ogura et al. | 95/224 |
| 2007/0084778 A1 | 4/2007 | St. Germain et al. | |
| 2007/0227674 A1 | 10/2007 | Haslem et al. | |
| 2007/0235146 A1 | 10/2007 | Haslem et al. | |
| 2007/0246414 A1 | 10/2007 | Page et al. | |
| 2009/0199972 A1 | 8/2009 | Lakatos et al. | |
| 2010/0044322 A1 * | 2/2010 | Fujisato et al. | 210/758 |
| 2011/0139378 A1 | 6/2011 | Lakatos et al. | |

OTHER PUBLICATIONS

Office Action issued May 9, 2012 in U.S. Appl. No. 12/029,377, filed Feb. 11, 2008.
Brochure entitled *A Simple Solution to Complex $H_2O$ Treatment Problems: UNICEL, Induced Gas Flotation Separators*, published at least as early as Dec. 10, 2009, 3 pages.
Office Action issued Jan. 19, 2011 in U.S. Appl. No. 12/029,377, filed Jan. 1, 2011.
Final Office Action issued Aug. 17, 2011 in U.S. Appl. No. 12/029,377, filed Feb. 11, 2011.
Office Action issued May 9, 2012 in U.S. Appl. No. 12/029,377, filed Feb. 11, 2011.
International Preliminary Report issued Jun. 12, 2012, in PCT Application No. PCT/US2010/059941, filed Dec. 10, 2010.

* cited by examiner

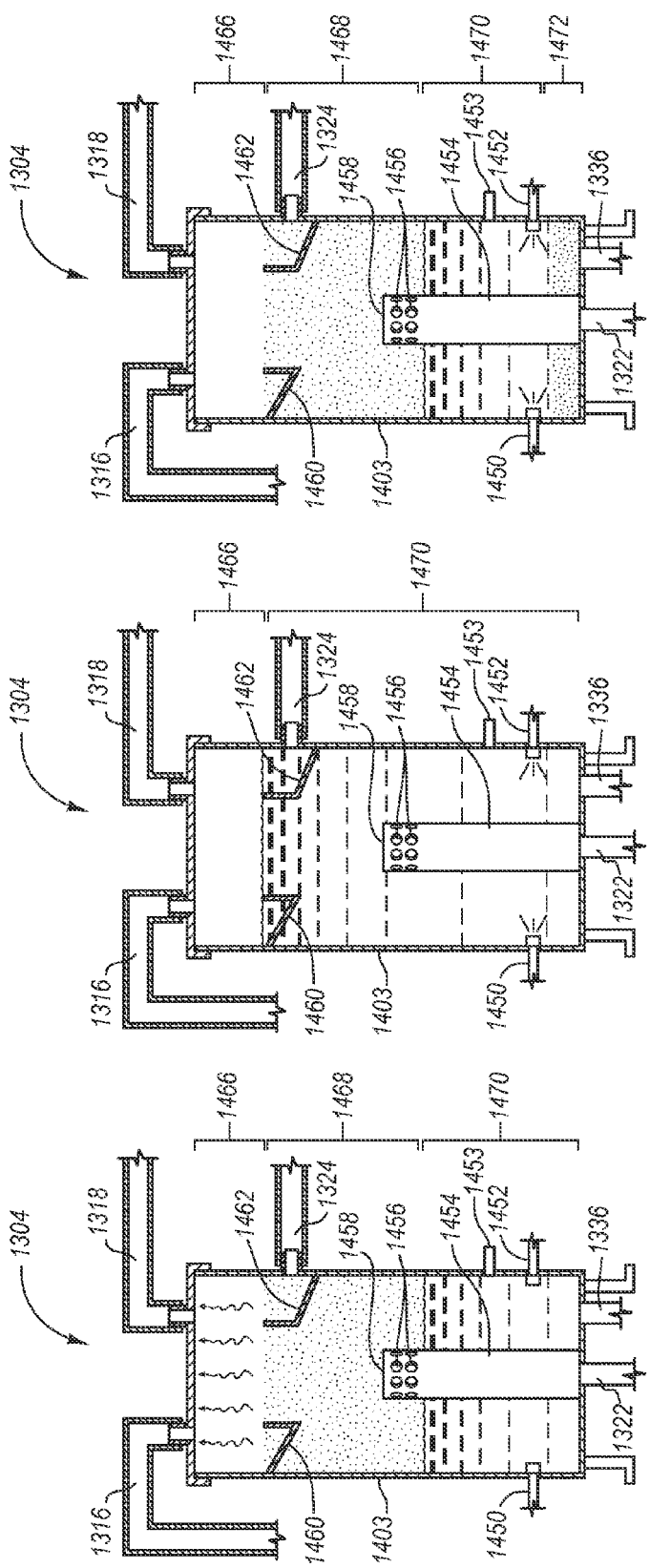

WASTEWATER PRE-TREATMENT AND EVAPORATION SYSTEM

CROSS-REFERENCE TO RELATED APPLICATIONS

This application claims the benefit of U.S. Provisional Application No. 61/285,901, filed Dec. 11, 2009, the disclosure of which is incorporated herein by specific reference.

BACKGROUND OF THE INVENTION

1. The Field of the Invention

The present invention relates to wastewater treatment systems and methods that utilize a water evaporator for separating wastewater from salts, minerals, and/or oil and/or gas.

2. The Relevant Technology

As natural gas is extracted from a ground well, a significant quantity of water accompanies the natural gas. This water is typically separated from the natural gas at a location proximate to the well head and then stored in an adjacent tank. Because of contaminants within the water, the water is typically trucked to a licensed disposal facility where it is deposited in a lined pond for evaporation. This same operation also typically occurs in the production of oil wells. That is, a significant quantity of water will often accompany extracted oil. The water and oil are deposited in a settling tank where the water and oil are separated. The water is then typically trucked to a licensed disposal facility where it is deposited in a lined pond for evaporation. Evaporation of the collected water is typically enhanced by sprinkler systems that spray the water into the air over the pond.

Although the above process is functional, there are significant costs in having to repeatedly ship the water to the disposal facility. There are also significant costs charged by the disposal facility to accept the water. Furthermore, trying to dispose of water through an evaporation pond can be problematic. For example, under windy conditions the sprinkler system cannot be operated due to the risk of non-evaporated fluid being carried by the wind onto the surrounding area. Furthermore, during colder or high humidity conditions, evaporation may fall below a desired evaporation rate.

Accordingly, what is needed are systems that eliminate or minimize the above problems or shortcomings.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

FIG. 14 is a cross section of a separation unit of the pretreatment system shown in FIG. 13 during operation;

FIG. 15 is a cross section of a separation unit of the pretreatment system shown in FIG. 13 during a foam clean out stage; and FIG. 16 is a cross section of a separation unit of the pretreatment system shown in FIG. 13 during a solids cleanout stage.

DETAILED DESCRIPTION

The present invention relates to wastewater treatment systems and methods for treating wastewater streams. The wastewater treatment systems include a water evaporator that reduces the volume of the wastewater. The wastewater treatment systems can also include additional components or systems to perform one or more of the following features: separating components of the wastewater stream, collecting the evaporated water, generating electrical or mechanical power, and/or utilizing low-value hydrocarbons in a cost effective and environmentally friendly manner.

The water evaporation systems include a housing assembly providing a fluid reservoir and bounding an air flow path. A misting system is configured to spray wastewater from the fluid reservoir into the air flow path. A portion of the wastewater is evaporated, thereby concentrating salts and/or minerals in the fluid reservoir. The concentrated waste can be efficiently handled and/or disposed of.

The wastewater treatment systems include one or more sources of heat, which is delivered through the air flow path of the housing assembly to enhance evaporation. In various embodiments of the invention, the wastewater treatment system can include generators, motors, thermal oxidizers, gas furnaces, and the like to generate heat and/or create an airstream that can evaporate substantial quantities of water. The use of these components can produce a synergistic benefit that enhances the environmentally favorable treatment and disposal of a wastewater stream.

In some embodiments of the invention, the evaporation system can include one or more demisters near the air outlet of the evaporation system to remove suspended water droplets. The demisters remove suspended water without preventing expulsion of the evaporated water, thereby reducing amount of salt, metals, and other dissolved materials that escape through the airstream.

Some embodiments of the invention may also include a pretreatment system for separating hydrocarbons and wastewater to further facilitate efficient evaporation of the wastewater in the water evaporator.

In yet other embodiments, the water treatment systems can include condensers downstream from the evaporation system to condense the evaporated water from the air stream to produce desalinated and/or potable water.

Although the water treatment systems can be used in a variety of different situations where it is desirable to evaporate a large quantity of water, the present invention will often be used in association with the oil and gas industry. Some embodiments of the invention may be particularly advantageous when carried out at or near the oil and/or gas well.

Figure 1:
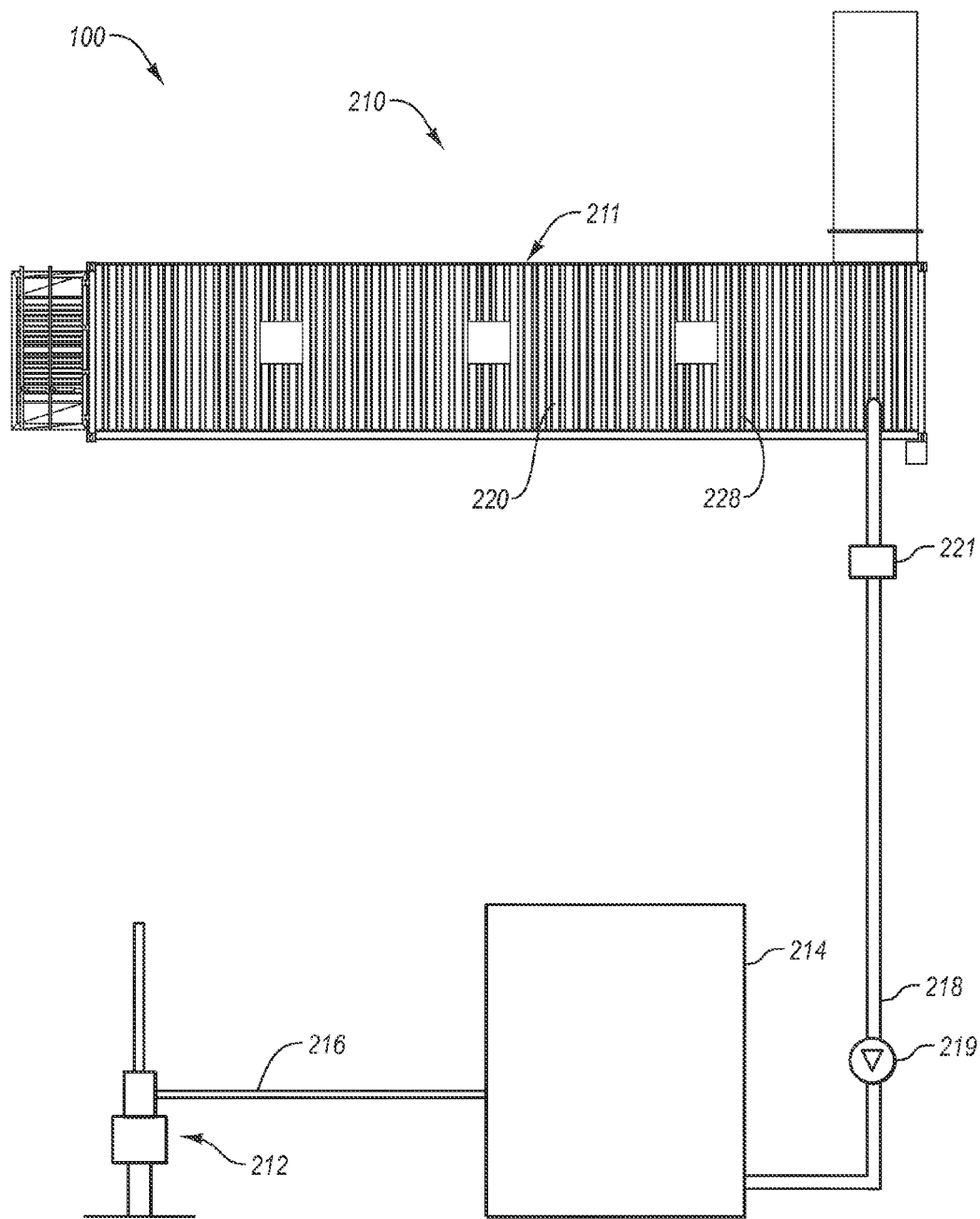
FIG. 1 is an elevated side view of one embodiment of an inventive wastewater treatment system that includes a water evaporation system in fluid communication with a well source and storage and separation system.

Depicted in FIG. 1 is one embodiment of a wastewater treatment system 100 incorporating features of the present invention. In general, wastewater treatment system 100 comprises a well source 212 that operates in conjunction with a storage and separation system 214 and a water evaporation system 210. Well source 212 can be part of an oil or gas well. Well source 212 can include any number of wells; and, where two or more wells are provided, the wells can extract the same or different hydrocarbons. The hydrocarbons in well source 212 include wastewater. The wastewater from well source 212 may include emulsified hydrocarbons and/or dissolved minerals and/or salts. The concentration of the hydrocarbons, salts, minerals, and/or other contaminants in the wastewater from well source 212 are typically sufficient to preclude free release of the wastewater into the environment without proper treatment. In an alternative embodiment, well source 212 may be brackish water such as sea water, where the desired separation is the separation of water from dissolved salts to produce condensed, desalinated water.

During production of well source 212, fluids such as water and oil are passed out of well source 212 and are delivered, either directly or indirectly, to storage and separation system 214. Storage and separation system 214 can be an underground storage tank and/or above ground storage tanks. Storage and separation system 214 can include a single tank or two or more tanks in series and/or in parallel. In one embodiment, storage and separation system 214 can include a separation apparatus that separates crude hydrocarbons into a wastewater stream and hydrocarbon products. Within storage and separation system 214, the water and oil separate with the oil rising to the top and the water settling to the bottom. A pipe 218 is then used to convey the wastewater from storage and separation system 214 to water evaporation system 210. The water can be conveyed either under the force of gravity or by the use of a pump 219. As discussed below in greater detail, water evaporation system 210 is then used to evaporate the water and disperse it into the surrounding environment. If desired, a flow meter 221 can be mounted on pipe 218 so as to provide an exact measurement of how much fluid has been evaporated through water evaporation system 210.

It is appreciated that the water can be delivered to water evaporation system 210 using a variety of different methods. For example, in contrast to storage and separation system 214 being fluid coupled with a well head, the fluid can be delivered to storage and separation system 214 by truck, rail, or other transport mechanism. Furthermore, in contrast to water evaporation system 210 being coupled with storage and separation system 214, the water can be delivered to water evaporation system 210 directly from a settling pond or other type of container system Likewise, the water can be delivered to water evaporation system 210 directly from a truck, rail car, or other type of vehicle.

The wastewater is delivered to evaporation system 210 to have its mineral content concentrated. Concentrated waste 126 can then be more economically disposed of. In one embodiment, wastewater stream 106 and/or 120 is delivered to evaporation system 210 with a total dissolved solids content in a range from about 1% to about 15%, more typically in a range from about 2%-10%. The concentrated waste 126 has a higher mineral concentration. In one embodiment, the total dissolved solids of concentrated waste 126 may be in a range from about 10% to about 70%, more typically in a range from about 15% to about 50%.

Figure 2:
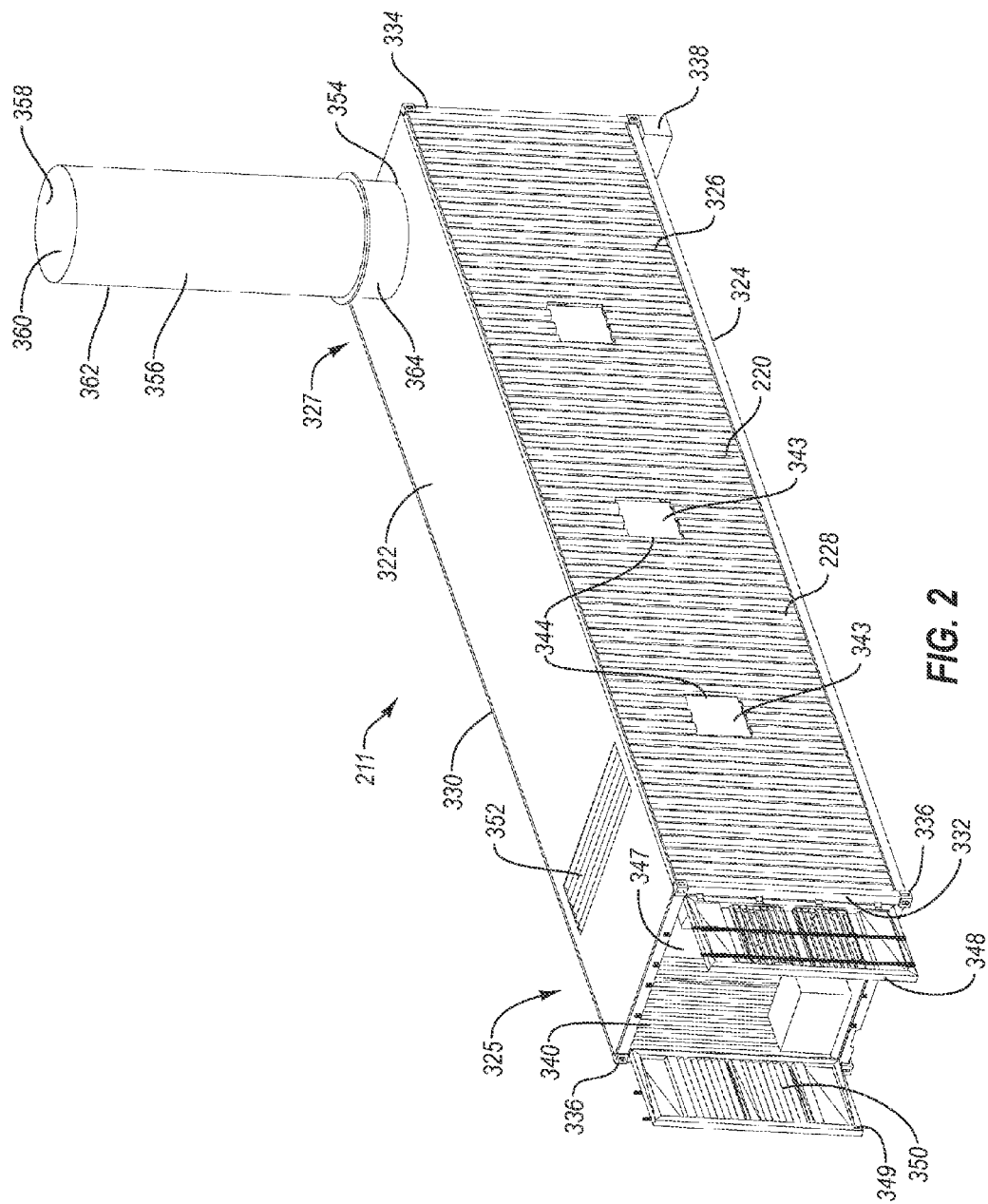
FIG. 2 is a front perspective view of the water evaporation system shown in FIG. 1.

Turning to FIG. 2, water evaporation system 210 comprises a housing assembly 211. Housing assembly 211 can include an evaporator housing 220 having a substantially parallelepiped configuration that includes a substantially flat roof 322 and an opposing floor 324 that each extend between a first end 325 and an opposing second end 327. An encircling sidewall 326 extends between roof 322 and floor 324. Encircling sidewall 326 includes a first sidewall 228 and an opposing second sidewall 330 that each extend between a first end wall 332 and an opposing second end wall 334. In the embodiment depicted, housing 220 is elongated with a central longitudinal axis extending between first end wall 332 and second end wall 334. In alternative embodiments, housing 220 need not be elongated. Likewise, housing 220 need not have a parallelepiped configuration. For example, roof 322 can be pitched as opposed to being flat. Hooking ports 336 are formed on a plurality of the corners of housing 220 and are typically formed on all eight corners of housing 220. Hooking ports 336 comprise small openings which can receive hooks, straps, or fasteners for lifting, transporting, or securing housing 220.

In one embodiment, housing 220 comprises a standard metal shipping container having standard dimensions that has been modified for the intended use of the present invention. For example, standard metal shipping containers intended for intercontinental use typically have external standard dimensions of length 20 feet (6.10 m), 30 feet (9.14 m), or 40 feet (12.20 m); width of 8 feet (2.44 m); and height of 8.5 feet (2.59 m) or 9.5 feet (2.90 m). These dimensions are only approximations and can vary within a few inches, such as within six inches (0.15 m). For example, the 30 feet containers are typically closer to 29.9375 feet (9.125 m) in length. Other standard and non-standard dimensions can also be used. In the illustrated example of the present invention, housing 220 has a length of 40 feet (12.20 m), a width of 8 feet (2.44 m), and height between 8.5 feet (2.59 m) to 9.5 feet (2.90 m) each within a tolerance of six inches (0.15 m).

By forming housing 220 out of standard shipping containers, housings 220 can be stacked, if desired, and easily transported by rail, ship, truck or the like using conventional techniques. In an alternative embodiment, housing 220 can be custom designed having other dimensions and configurations and can be made from other materials such as wood, plastic, fiberglass, composite, and the like.

Figure 3:
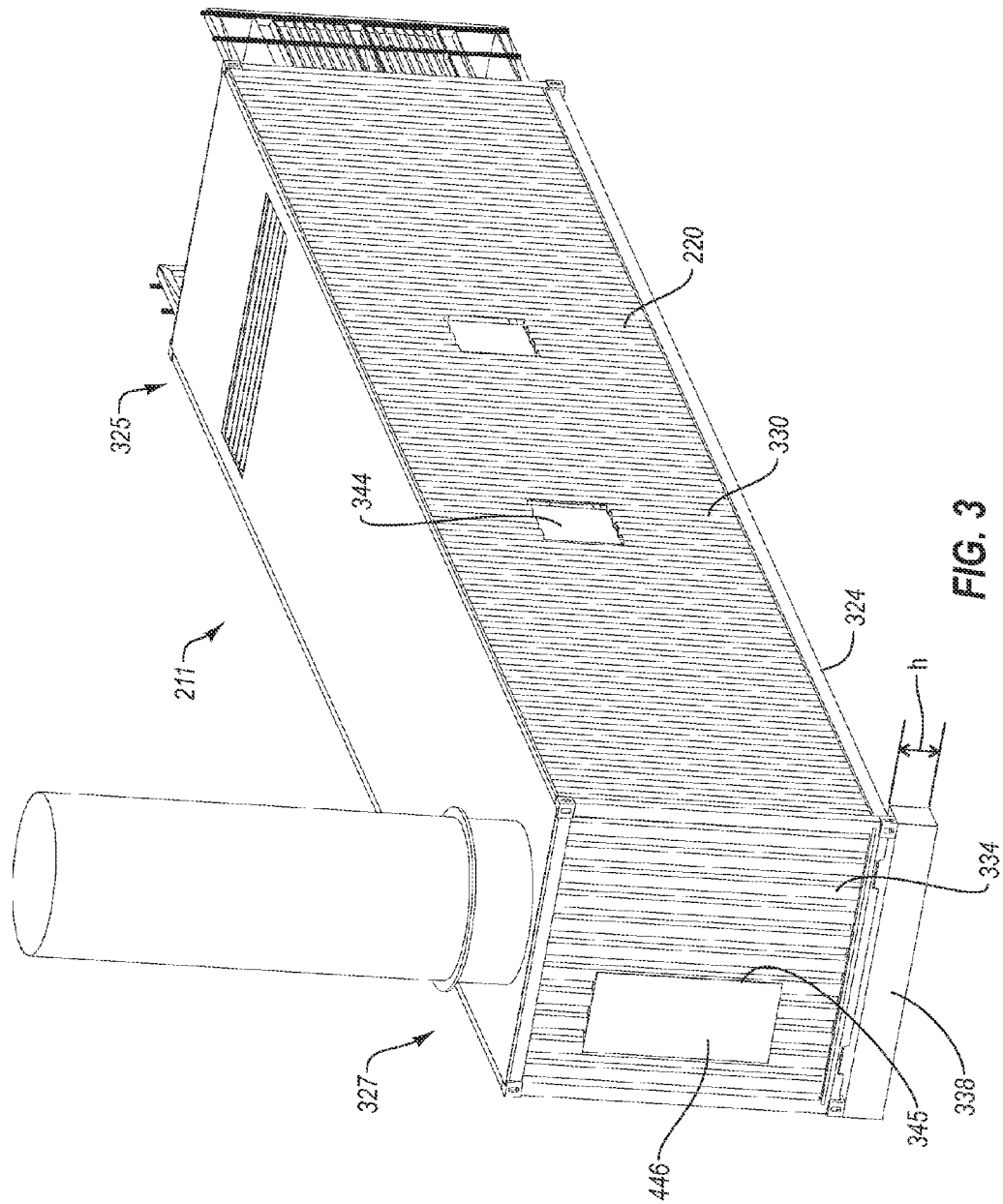
FIG. 3 is a rear perspective view of the water evaporation system shown in FIG. 1.

Depicted in FIGS. 2 and 3, a support 338 is mounted on floor 324 at second end 327 so as to downwardly project from floor 324. Support 338 typically has a height "h" in a range between about 15 cm to about 90 cm with about 20 cm to about 45 cm being more common. Other heights can also be used or support 338 can be eliminated. Support 338 can be mounted to housing 220 by welding, fasteners, or other conventional techniques. As will be discussed below in greater detail, support 38 functions to elevate second end 327 such that when housing 220 is disposed on a flat surface, floor 324 downwardly slopes from second end 327 to first end 325. In alternative embodiments, support 338 need not be directly mounted to floor 324 but can merely be positioned beneath floor 324 when positioning housing 220.

Figure 4:
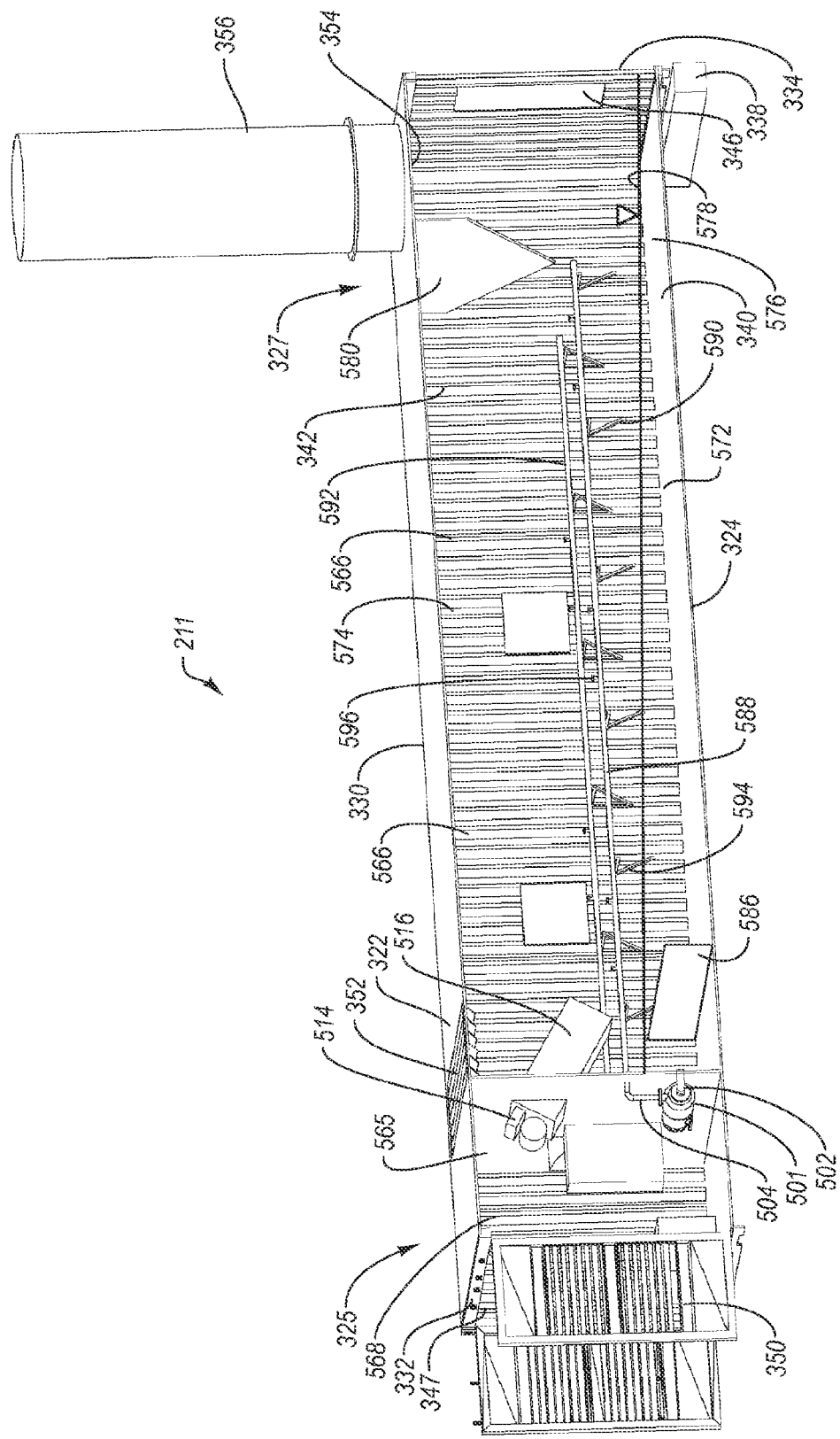
FIG. 4 is a cutaway front perspective view of the water evaporation system shown in FIG. 1.

As depicted in FIG. 4, housing 220 has an interior surface 340 that bounds a chamber 568. A partition wall 565 is disposed within chamber 568 at or towards first end 325 so as to divide chamber 568 into an evaporation chamber 566 disposed towards second end 327 and a storage chamber 68 disposed towards first end 325. Partition wall 565 typically extends from roof 322 to floor 324 and between opposing walls 228 and 330. However, partition wall 565 need not extend all the way to roof 322 and/or openings can be formed through partition wall 565.

As depicted in FIG. 2, a plurality of spaced apart access ports 344 extend through a first sidewall 228 and second sidewall 330 so as to communicate with evaporation chamber 566. Access ports 344 are typically positioned at a height of at least about 1 meter above floor 324 (although other heights can also be used) and are sized to enable an individual to reach therethrough for accessing spray nozzles, as will be discussed below in greater detail, that are positioned within evaporation chamber 566. Each access port 344 can have a corresponding door 343 mounted on first sidewall 228 and second sidewall 330 for selectively closing and, if desired, locking access ports 344. Doors 348 and 349 can be hingedly, slidably, or removably mounted to the sidewalls. In alternative embodiments, it is appreciated that access ports 344 and doors 348 and 349 can be eliminated so that no openings are formed in the sidewalls.

As depicted in FIG. 3, a doorway 347 is formed on second end wall 334 to permit selective entrance into evaporation chamber 566. The bottom of doorway 347 is typically elevated a distance above floor 324 to help retain fluid within evaporation chamber 566. A door 348 can be hingedly mounted on second end wall 334 to permit selective closure of doorway 347. In alternative embodiments, doorway 347 can be eliminated and replaced with an access opening formed at some other location on housing assembly 211.

With reference to FIG. 2, a doorway 347 can be formed on first end wall 332 for accessing storage chamber 568 at first end 325. A pair of opposing doors 348 and 349 are shown mounted on first end wall 332 for selectively closing doorway 347. Doors 348 and 349 have a plurality of slots 350 extending therethrough so that air can pass from the surrounding environment into storage chamber 568 by passing through slots 350. As will be discussed below in greater detail, it is desirable to have a fresh air inlet to storage chamber 568 so as to help control the temperature therein and to provide combustion air for the generator, furnace, and/or other mechanics that can be positioned within storage chamber 568. In alternative embodiments, slots 350 can be replaced with or supplemented by other openings formed in doors 348 and 349, first end wall 332, sidewalls 228 and 330 and/or roof 322 for providing air to storage chamber 568.

An inlet opening 352 extends through roof 322 so as to communicate with evaporation chamber 566 at first end 325 while an outlet opening 354 extends through roof 322 so as to communicate with evaporation chamber 566 at second end 327. As will be discussed below in greater detail, housing assembly 211 can include a tubular stack 356 mounted on roof 322 so as to be disposed over outlet opening 354. Stack 356 has an interior surface 358 bounding a passage 360 extending between an upper end 362 and an opposing lower end 364. Upper end 362 provide an outlet opening for housing assembly 211. Stack 356 typically has a height extending between the opposing ends in a range between about 1 meter to about 30 meters with about 2 meters to about 5 meters being more common. Other lengths can also be used. In one embodiment, stack 356 can be hingedly mounted to roof 322 so that stack 356 can be selectively folded over to rest on top of roof 322 during transport of housing 210 and then folded upward and secured in position for final use.

Returning to FIG. 4, evaporation chamber 566 generally comprises a fluid reservoir 572 and an air flow path 574. More specifically, fluid reservoir 572 is bounded by floor 324 and the lower end of first sidewall 228, second sidewall 230, second end wall 334, and partition wall 65. These structural elements are secured together and are typically covered with a sealant so as to minimize rust and be substantially water tight. As a result, a fluid 576 can be pooled within fluid reservoir 572, the pool of fluid 576 having a top surface designated by a line 578. In alternative embodiments, various types of liners or one or more large containers can be positioned on or adjacent to floor 324 so as to form fluid reservoir 572.

As previously discussed with regard to FIG. 1, fluid 576 is delivered to fluid reservoir 572 thorough a pipe 218 fluid coupled with housing 220. It is again appreciated that fluid 576 can be delivered to fluid reservoir 572 in a variety of different ways such as through a hose, tube, pipe, or even through an opening in housing 220 through which fluid 576 is poured. It is also noted that fluid 576 can be delivered to fluid reservoir 572 through any surface of housing assembly 211. In the embodiment depicted, fluid 576 is delivered to fluid reservoir 572 through first sidewall 228 at second end 327 of housing 220. As a result of support 338, floor 324 slopes downwardly toward partition wall 565. Accordingly, once fluid 576 enters fluid reservoir 572, fluid 576 flows down toward partition wall 565. In an alternative embodiment, all or a portion of fluid reservoir can be stored in a separate compartment of housing assembly 211. However, providing fluid reservoir 572 on a floor of housing 220 minimizes storage costs and improves evaporation.

In one embodiment of the present invention, means are provided for filtering fluid 576. By way of example and not by limitation, a weir 586, as shown in FIG. 4, upwardly projects from floor 324 and extends between opposing sidewalls 228 and 330. Weir 586 can be located at any position between partition wall 565 and second end wall 334 but is typically disposed closer to partition wall 565. Before reaching partition wall 565, fluid 576 must pass over weir 586. As a result, weir 586 helps to retains solids and other particulate matter on the upstream side of weir 586, thereby filtering fluid 576. In alternative embodiments, two or more spaced apart weirs can be formed on floor 324. One or more holes can be formed through the one or more weirs so that the fluid can pass therethrough but larger solids are preventing from passing therethrough. In still other embodiments, sections of screens or other filtering material can be positioned to extend between opposing sidewalls 228 and 330 so as to screen and thereby filter the fluid as is passes therethrough. Other conventional filtering techniques can also be used. Door 446 can be used to periodically access fluid reservoir 572 for cleaning out solids that have collected therein. In alternative embodiments, it is appreciated that support 338 can be eliminated and that floor 324 can be horizontally positioned. This is especially true where the fluid is filtered before entering fluid reservoir 572 or where filtering techniques other than weir 586 are used.

Air flow path 574 comprises the area within the evaporation chamber 566 that is vertically above fluid reservoir 572. Accordingly, from one perspective, the boundary between air flow path 574 and reservoir 572 can be top surface 578 of pooled fluid 576. That is, the area above top surface 578 is air flow path 574 while the area below top surface 578 is fluid reservoir 572. As top surface 578 raises within evaporation chamber 566, the volume of fluid reservoir 572 increases while the volume of air flow path 574 decreases.

With continued reference to FIG. 4, inlet opening 352 extends through roof 322 so as to communicate with first end 325 of evaporation chamber 566/air flow path 574 while outlet opening 354 extends through roof 322 so as to communicate with second end 327 of evaporation chamber 566/ air flow path 574. A baffle 580 projects into air flow path 574 at a location between inlet opening 352 and outlet opening 354 so as to constrict the area of air flow path 574 thereat. In the embodiment depicted in FIG. 6, baffle 580 comprises a plate that downwardly projects from the interior surface of roof 322 so as to extend substantially orthogonal thereto. In alternative embodiments, baffle 580 can extend so as to form an inside angle between baffle 580 and roof 322 in a range between about 40° to about 140° with about 60° to about 120° being more common. Other angles can also be used. Baffle 80 can also be mounted to roof 322 by a hinge 583 so that baffle 580 can be selectively rotated out of the way for accessing evaporation chamber 566 or for positioning baffle 580 at a desired angle for controlling air flow past baffle 580.

In the embodiment depicted baffle 580 has a substantially rectangular base portion 582 extending between opposing sidewalls 228 and 330 and a substantially triangular portion 84 that extends from base portion 782 down to an apex 786 that is centrally positioned between opposing sidewalls 228 and 330. It is appreciated that baffle 580 can come in a variety of different sizes, shapes, and configurations. Examples include, but are not limited to baffles having a substantially triangular, semicircular or semielliptical configuration, or a substantially square or rectangular configuration. Baffle 580 can be positioned above top surface 578 of pooled fluid 576. Alternatively, baffle 580 or any of the other baffles can be formed from a porous material or have a plurality of openings 581 that extend therethrough so that the air and moisture can pass therethrough. In this embodiment, the baffle can extend down into pooled fluid 576. It is also noted that baffle 80 need not be a flat plate but can be contoured and/or can have a uniform or varied thickness.

Figure 5:
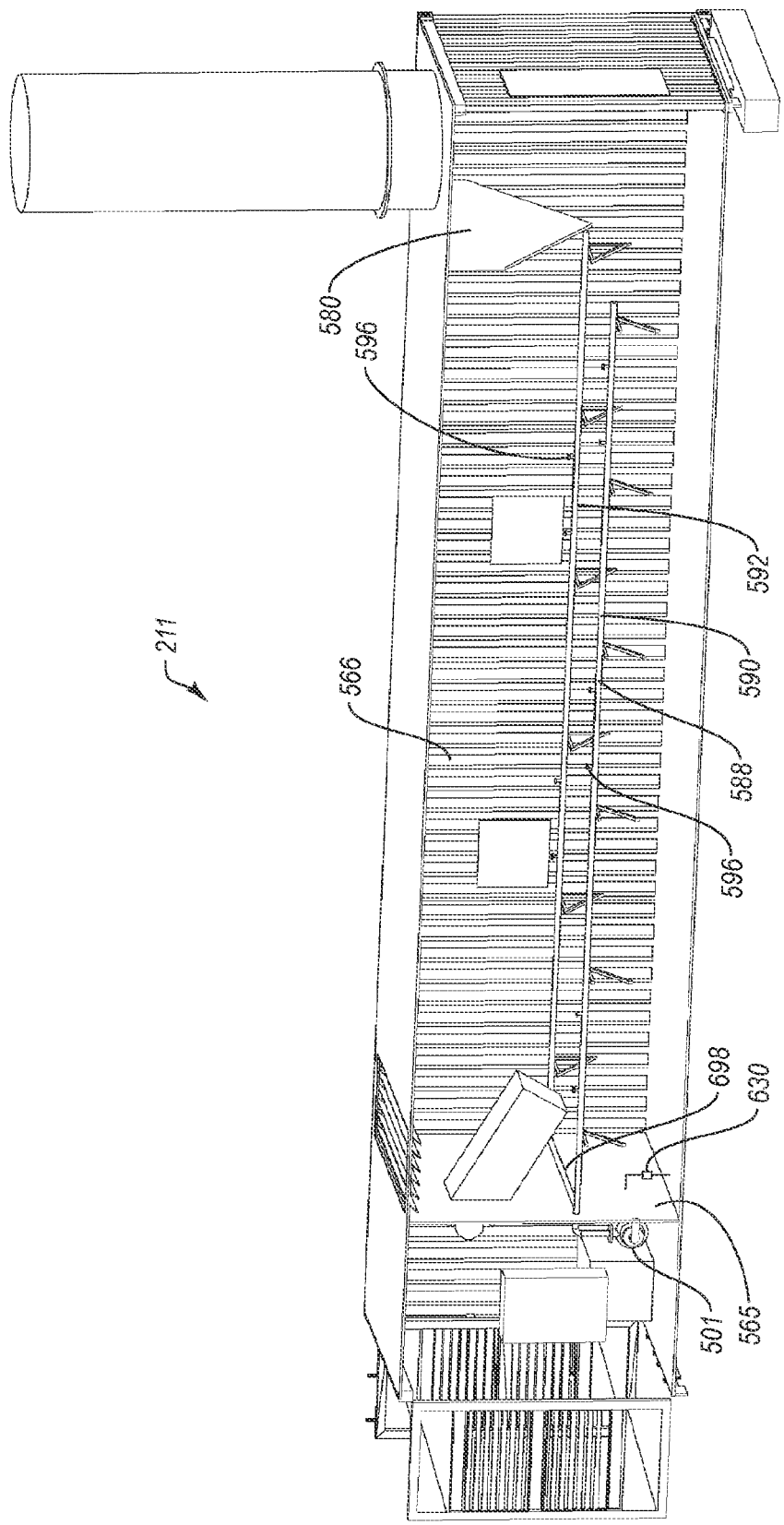
FIG. 5 is a cutaway rear perspective view of the water evaporation system shown in FIG. 1.

In one embodiment of the present invention, means are provided for regulating the level of fluid 576 within fluid reservoir 572. By way of example and not by limitation, a sensor 630 (FIG. 5) is mounted on partition wall 565 within evaporation chamber 566 and is electrically coupled with pump 219 (FIG. 1). In one embodiment, sensor 630 comprises a float sensor wherein when top surface 578 of pooled fluid 576 drops below a certain level, pump 501 is activated and fluid 576 is pumped into fluid reservoir 572. When top surface 578 of pooled fluid 576 reaches the desired level, sensor 630 turns pump 501 off. It is appreciated that sensor 630 can be positioned at any location that will enable it to sense the level of pooled fluid 576 and that sensor 630 can comprise any type of sensor, such an electrical eye, pressure sensor, or the like, that can determine the level of pooled fluid 576.

Figure 6:
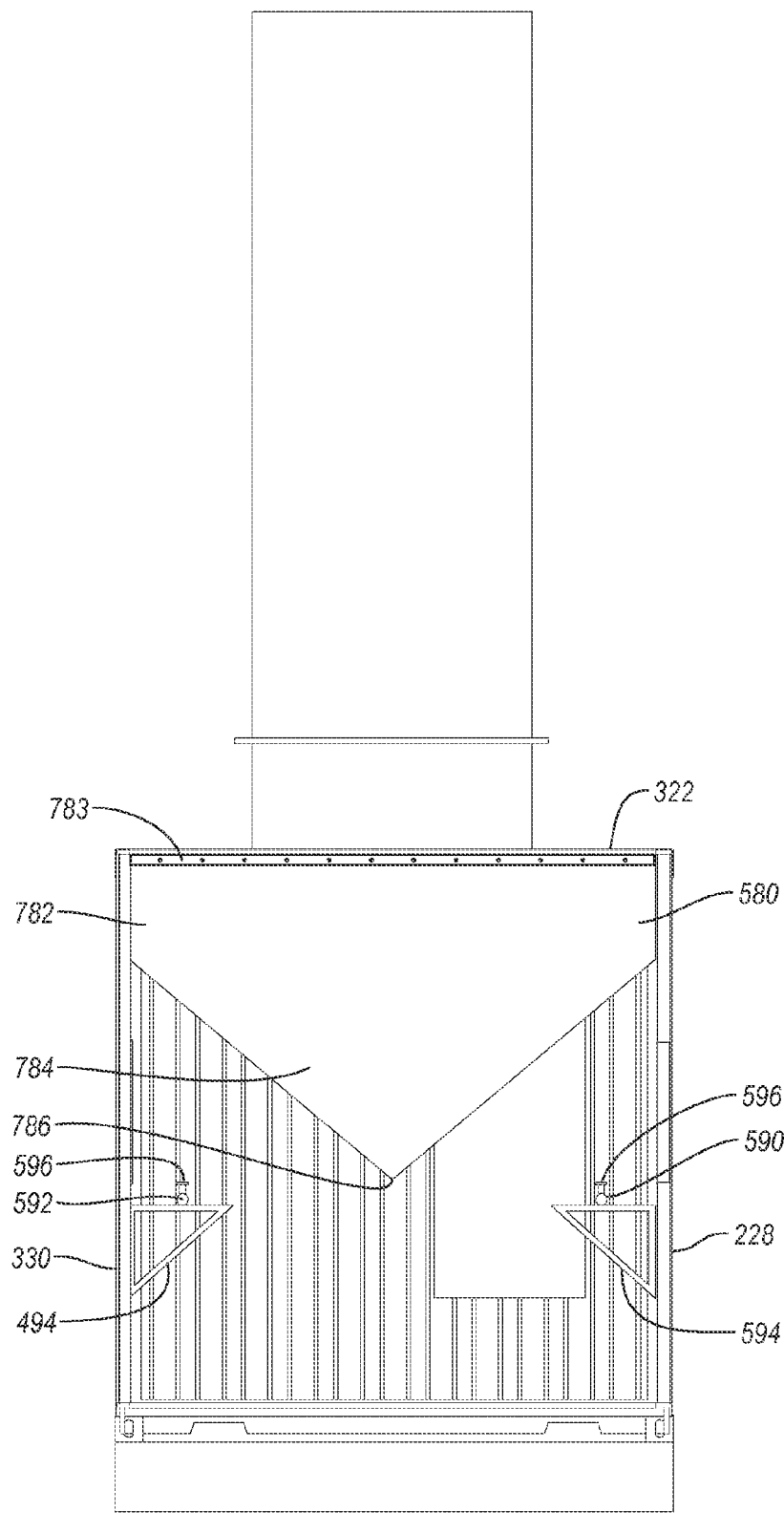
FIG. 6 is a cross sectional front view of the evaporation chamber of the water evaporation system shown in FIG. 1.
Figure 7:
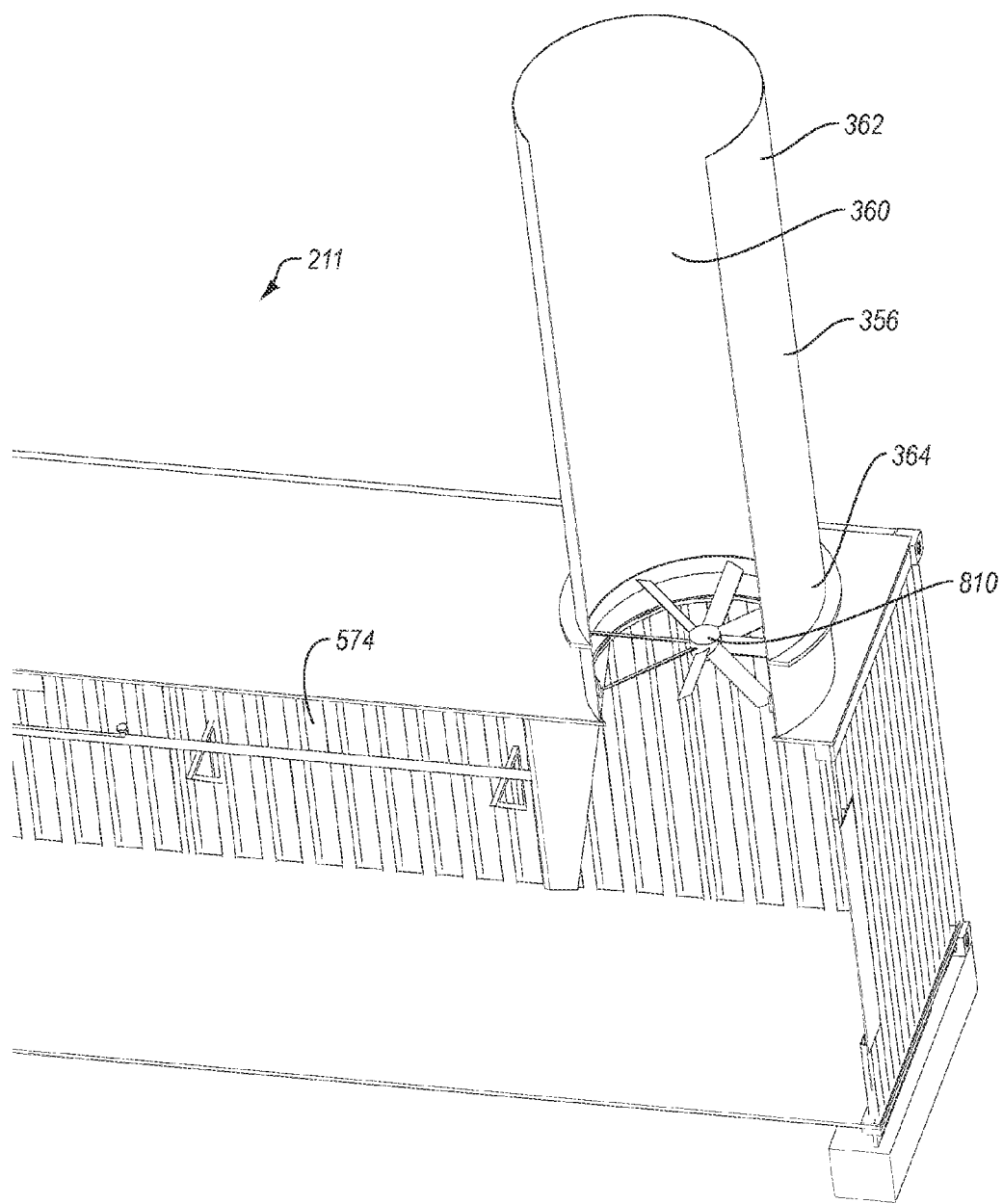
FIG. 7 is a partially cutaway perspective view of the water evaporation system shown in FIG. 1 depicting a fan disposed within the stack.

Returning to FIGS. 4 and 5, means are provided for misting or spraying fluid 576 pooled within fluid reservoir 572 into air flow path 574 between baffle 580 and inlet opening 352. By way of example and not by limitation, piping 588 is disposed within evaporation chamber 566 and generally extends between partition wall 565 and baffle 580. More specifically, piping 588 comprises a first pipe section 590 that extends along the interior of first sidewall 528 while a second pipe section 592 extends along the interior of second sidewall 30. Both pipe sections generally extending between partition wall 565 and baffle 580 but can extend beyond baffle 580. As depicted in FIG. 6, brackets 594 are used to secure pipe sections 590 and 592 to their corresponding sidewalls so that the pipe sections are inwardly set a distance from the sidewalls. Longitudinally spaced along pipe sections 590 and 592 are a plurality of spray nozzles 596. Spray nozzles 596 are position and oriented so that fluid entering the pipe sections is outwardly and upwardly sprayed through spray nozzles 596. Returning to FIG. 4, a pipe section 698 extends between first and second pipe sections 590 and 592 so as to provide fluid communication therebetween.

Disposed within storage chamber 568 is a pump 501. As shown in FIG. 3, pump 501 has an inlet pipe 502 that extends through partition wall 565 so as to be in fluid communication with fluid reservoir 572. Pump 501 also has an outlet pipe 504 that extends through partition wall 565 so as to be in fluid communication with piping 588. During operation, pump 501 draws in fluid 576 from fluid reservoir 572 and pumps it out into piping 588. Fluid 576 exits piping 588 through spray nozzles 596 wherein fluid 576 sprays upwardly within air flow path 574 and then travels downward back into fluid reservoir 572 where the cycle then continues. To optimize spraying of fluid 576, spray nozzles 596 are positioned above top surface 578 of pooled fluids 576.

As will be discussed below in greater detail, at least a portion of fluid 576 sprayed within air flow path 574 evaporates and is removed out of air flow path 574. By having fluid 576 sprayed upward and then fall back down, the duration that the sprayed fluid 576 is suspended within air flow path 574 is maximized so as to maximize evaporation of fluid 576 within air flow path 574. In an alternative embodiment, fluid 576 can simply be sprayed down from roof 322.

It is appreciated that the means for spraying fluid 576 pooled within fluid reservoir 572 can have a variety of different configurations. By way of example and not by limitation, it is appreciated that piping 588 can be mounted on or below floor 324 and/or on or above roof 322. Elongated risers can then be used to position spray nozzles 596 at the desired position within air flow path 574. In contrast to having two pipe sections 590 and 592, it is appreciated that a single pipe section can be used that is either centrally positioned between or is positioned along one of the sidewalls. Alternatively, three or more spaced apart pipe sections can be used. It is likewise appreciated that the, type, size, configuration, number, orientation, and position of spray nozzles 596 can be dramatically varied. The general concept is to spray fluid 576 into air flow path 574 at a flow rate and concentration that will maximize the evaporation of fluid 576 within air flow path 574.

In one embodiment of the present invention, means are provided for drawing air from the surrounding environment into air flow path 574 through inlet opening 352 and for drawing the air out of air flow path 574 through outlet opening 354. By way of example and not by limitation, depicted in FIG. 7 is a fan 810 disposed within passage 360 of stack 356 at lower end 364 thereof. During operation, fan 810 draws air up and out of air flow path 574 which then passes through passageway 360 of stack 356 and then out into the surround environment. As air is drawn out of air flow path 374 by fan 810, a low pressure is created within air flow path 574 which causes air from the surrounding environment to be drawn into air flow path 574 through inlet opening 352, as shown in FIG. 4. As such, during operation of fan 810, air from the surrounding environment is continually being drawn from the surrounding environment into air flow path 574 through inlet opening 352. The air then travels along the length of air flow path 374 over top of fluid reservoir 372, passes around baffle 580, and then travels up and out to the surrounding environment through stack 356.

It is appreciated that a variety of different types of fans can be used within stack 356 or outlet opening 354 for drawing the air out of air flow path 574. In alternative embodiments, it is appreciated that a fan can be positioned at or adjacent to inlet opening 352 for drawing air into air flow path 574 or pushing air into airflow path 354. Likewise, in contrast to forming inlet opening 352 on roof 322, inlet opening 352 can also be formed on partition wall 565 and receive air through slot 350 or the alternatives thereto as previously discussed. Inlet opening 352 can also be formed on sidewall 228 or 330. Similarly, outlet opening 354 can be formed on sidewall 228 or 330 or end wall 334. In these embodiments, stack 356 would have a 90° elbow to connect with outlet opening 354.

During operation, a continuous flow of fresh air is drawn in from the environment and passed between inlet opening 352 and outlet opening 354 along air flow path 574. Spraying fluid 576 within air flow path 574 between inlet opening 352 and baffle 380 causes the air flow in that region to be highly turbulent. The combination of spraying fluid 576 in a fresh air stream that is highly turbulent and that is heated within air flow path 574 due to the ambient temperature and radiant energy striking housing 220 serves to optimize the evaporation of sprayed fluid 576 within air flow path 574.

Baffle 580 and stack 356 help to facilitate removal of non-evaporated water droplets from the air flow before the air flow exits stack 356 and travels back into the surrounding environment. This is to help ensure that water droplets do not simply pass out through stack 356 and then deposit on the ground surrounding housing 220. With regard to baffle 580, spray nozzles 596 typically do not extend past baffle 580 so that the air flow between baffle 580 and outlet opening 354 is less turbulent than between inlet opening 352 and baffle 580. Baffle 580 thus in part functions as a shield to help minimize the amount of sprayed fluid that is passed beyond baffle 580 and thus decrease air turbulence beyond baffle 580. Baffle 580 also partially constricts that area of air flow path 574 at the location of baffle 580. By constricting air flow path 574, the air flow becomes more laminar as it travels around baffle 580. Likewise, the air flow increases in speed as it travels through the area constricted by baffle 580 but then slows down as it expands into the larger space on the opposing side of baffle 580. As a result of producing a slower, less turbulent air flow, fluid droplets that are carried by the air flow but that have not yet evaporated, drop out of the air flow and back into fluid reservoir 572. Stack 556 provides added retention time for the air flow to help ensure that substantially all of the non-evaporated fluid droplets fall out of the air flow before the air flow exits stack 556. Furthermore, by being vertically oriented, the fluid droplets falling out of the air flow fall through the upcoming air flow so as to combine with and collect other fluid droplets.

On occasion, such as during the colder months of the year or during a short term cold period, the ambient temperature and radiant energy produced by the sun may not be sufficient to facilitate evaporation of fluid 576 at a desired rate. Accordingly, in one embodiment of the present invention, means are provided for blowing heated air into air flow path 574. By way of example and not by limitation, a furnace 514 is disposed within storage chamber 568. Furnace 514 comprises a heating element and a fan. A tubular vent 926 extends from furnace 514 through partition wall 565 into air flow path 572. Furnace 514 can be designed to operate on electricity, gasoline, natural gas and/or propane or other fuels. For example, natural gas from well head 112 can be used to operate furnace 514.

Turning to FIG. 8, a central processing unit (CPU) 920 can be used to operate and selectively control various mechanics of water evaporation system 210. For example, CPU 120 is electrically coupled with sensors 922. Sensors 922 can comprise humidity sensors, temperature sensors, wind sensors, pressure sensors, and other sensors that can be used in optimizing the operation of evaporation system 10. Sensors 122 can be positioned within storage chamber 568, outside of housing 220, and/or within evaporation chamber 566. Based on information such as the relative humidity and temperature, CPU 920 can selectively control the speed of fan 810, the flow rate of pump 501, and/or the operation of furnace 514. By selectively controlling and changing the operation of these mechanics, evaporation of fluid 576 can be optimized within evaporation chamber 566. For example, as the humidity in the surrounding environment increases, such as when raining, it may be necessary to slow down the speed of fan 810 and/or the flow rate of pump 501 so that water droplets are not passed out through stack 556. CPU 920 can also facilitate controlled operation of pumps 219 and 501, furnace 514, fluid level sensor 630 and fan 810.

Returning to FIG. 8, a generator 924 can be positioned within storage chamber 68. Generator 924 can be used to help facilitate operation of the various electrical components such as pumps 219 and 501, CPU 920, sensors 922 and 630, furnace 514, fan 810 and the like. A vent 926 extends through partition wall 565 to deliver exhaust from generator 924 to evaporation chamber 566 so as to help increase the temperature therein.

It is appreciated that the above discussion is only one embodiment of how water evaporation system 100 can be configured and that the various components can be moved around. For example, by making plumbing modification, it is appreciated that baffle 580 and stack 556 can be positioned toward partition wall 565 while inlet opening 352 and spray nozzles 596 are positioned toward second end wall 334.

The present invention also envisions a variety of other embodiments of wastewater treatment systems. For example, depicted in FIG. 9 is one embodiment of a wastewater treatment system 100A wherein like features between wastewater treatment system 100 and 100A are identified by like reference characters.

Wastewater treatment system 100A includes well source 212. Hydrocarbons extracted from well source 212 can be delivered via pipe 216 to be stored in storage and separation system 214. Hydrocarbons are separated in storage and separation system 214 to produce a wastewater stream 106 and hydrocarbon products 108. Storage and separation system 214 may also provide for separating volatile organic compounds (VOCs) 110 from wastewater stream 106 and hydrocarbon products 108. As explained in more detail below, the VOCs can be used to generate heat in a thermal oxidizer 114.

In one embodiment wastewater stream 106 may optionally be delivered to a pretreatment system 116 for additional separation. Pretreatment system 116 is described more fully below with respect to FIGS. 13-16. Pretreatment system 116 separates out emulsified and/or dissolved hydrocarbons 122 and solids 124, to produce a pretreated wastewater stream 120. Pretreated wastewater stream 120 can be supplied to a water evaporation system 210A to be reduced in volume and its impurities concentrated. Treated, concentrated wastewater is removed from water evaporation system 210A as vapor and concentrated waste 126. In one embodiment, concentrated waste 126 may be a slurry.

Wastewater treatment system 100A further includes one or more sources of heat for increasing the rate of evaporation of the wastewater in water evaporation system 210A. In one embodiment, the source of heat can be a thermal oxidizer 114 configured to oxidize volatile organics 110 from storage and separation system 214 and/or pretreatment system 116 and/or gas from well 212. In an alternative embodiment, methane and/or another type of hydrocarbon from well source 212 can be delivered through a pipe 128 to a furnace 514A and/or a generator 924A, where the fuel can be burned to produce heat, air flow, mechanical power, and/or electricity. The heat from furnace 514A and/or generator 924A can be delivered to water evaporation system 210A to facilitate the evaporation of wastewater. Generator 924A may also be connected to a power grid 134 and used to generate electrical power for grid 134.

In one embodiment, a significant portion of the heat generated for water evaporation system 210A can be a waste heat. The term "waste heat" includes heat derived from electrical generation and/or the burning or oxidizing of hydrocarbons that are of little value due to their impurity and/or cost of handling. For example, waste heat includes heat derived from the exhaust of an electrical generator and/or the thermal oxidation of volatile organic compounds, but does not include heat generated from burning pipeline quality gas in a furnace. In one embodiment, at least about 20% to about 100% of the total heat generated and input into water evaporation system 210 is a waste heat, more specifically about 30% to about 95%, and even more specifically 50% to about 90%. In one embodiment, at least about 30%-100% of the heat is produced from a turbine (i.e., non-reciprocating) engine, more specifically about 50% to about 70%. In one embodiment, about 10%-70%, of the heat is produced from a reciprocating engine, more specifically about 30% to about 50%. In one embodiment about 20% to about 100% is generated from a non-engine process such as a furnace or thermal oxidizer, more specifically about 30% to about 80%.

Any type of thermal oxidizer 114 may be used in system 100A so long as the thermal oxidizer is compatible with the hydrocarbon source being oxidized. Examples of suitable thermal oxidizers include regenerative thermal oxidizers, regenerative catalytic oxidizer thermal recuperative oxidizer, catalytic oxidizer, and/or direct fired thermal oxidizer (i.e. afterburner). The heat from the thermal oxidizer can be piped directly into water evaporation system 210A or can be used to heat wastewater stream 120 in a heat exchanger. Those skilled in the art are familiar with selecting thermal oxidizers that can efficiently create a hot air stream and/or heat a fluid in a heat exchanger. The use of thermal oxidizer 114 not only provide heat for the rapid evaporation of wastewater but it also efficiently and safely disposes of unwanted VOCs.

System 100A may also include furnace 514A as described above. Furnace 514A can be operated using natural gas or another hydrocarbon source. The hydrocarbon source can be purified, partially purified, unpurified, refined, and/or unrefined. Furnace 514A is typically configured and/or positioned within or adjacent water evaporation system 210 to maximize heat transfer to the air flow in evaporation system 210. For example, in one embodiment furnace 514A can have the same size and relative placement as furnace 514 as previously discussed with regard to FIG. 4. In alternative embodiments, furnace 514A can be disposed outside of water evaporator system 210A with the exhaust being piped into system 210. In one embodiment, furnace 514A can have a size in a range between about 5 million BTU to about 50 million BTU with about 10 million BTU to about 20 million BTU being more common. Other sizes of furnaces can also be used. Those skilled in the art are familiar with furnaces that can efficiently transfer heat to the air flow path.

Figure 8:
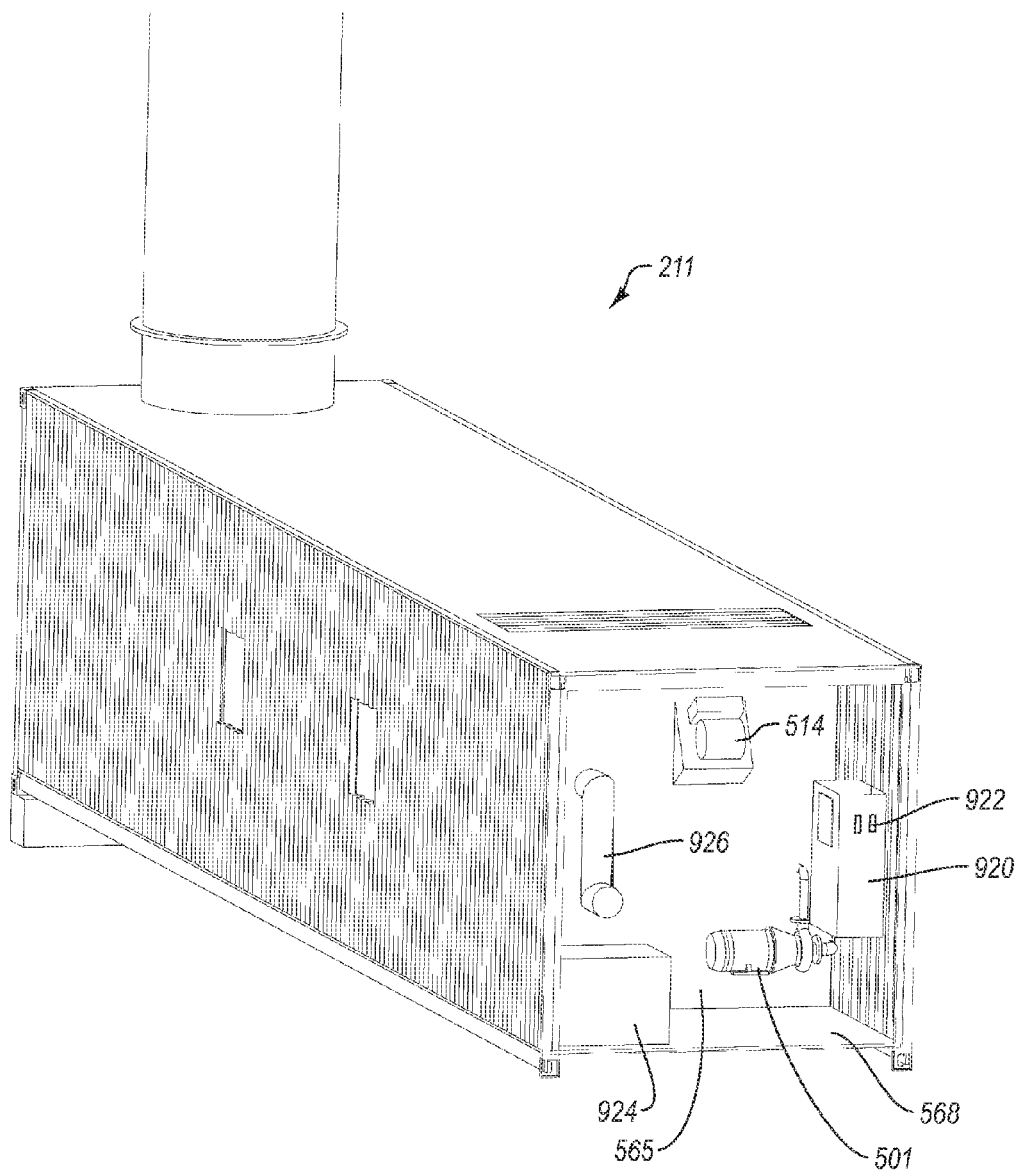
FIG. 8 is a perspective view of the storage compartment of the water evaporation system shown in FIG. 1.

Generator 924A can comprise any type of electrical generator. For example, generator 924A may be an internal combustion engine or a micro turbine. Generator 924A can be configured to generate electrical power for transferring to power grid 134. Thus, generator 924A can be used to convert the natural gas from well source 212 to electricity which can then be transferred onto power grid 134. This eliminates the need for creating a gas line that transfers the gas to an established collection line. In addition to or in the alternative, generator 924A can be configured to generate the electricity necessary to power all the electrical components and mechanical components of water treatment system 100A. For example, generator 924A can drive a compressor, pump, a control unit and various valves. Thus, generator 924A can comprise generator 924 as previously discussed with regard to FIG. 8. In one embodiment the power generated by generator 924A may be used to pump hydrocarbons from well source 212 and/or to pressurize hydrocarbons for cleaning in a gas conditioner and/or for transportation in a gas line. Thus, generator 924A may be substituted for or additionally include an engine and/or pumps that generate pressure with or without the use of electricity. Operating a natural gas driven pump to directly pipe gas into a gas line can be highly efficient since the exhaust from operating the gas-powered pump can be scrubbed in evaporation system 210. Those skilled in the art are familiar with generators, engines, turbines, and pumps suitable for generating electrical and/or mechanical power that can be utilized in system 100A.

Figure 12:
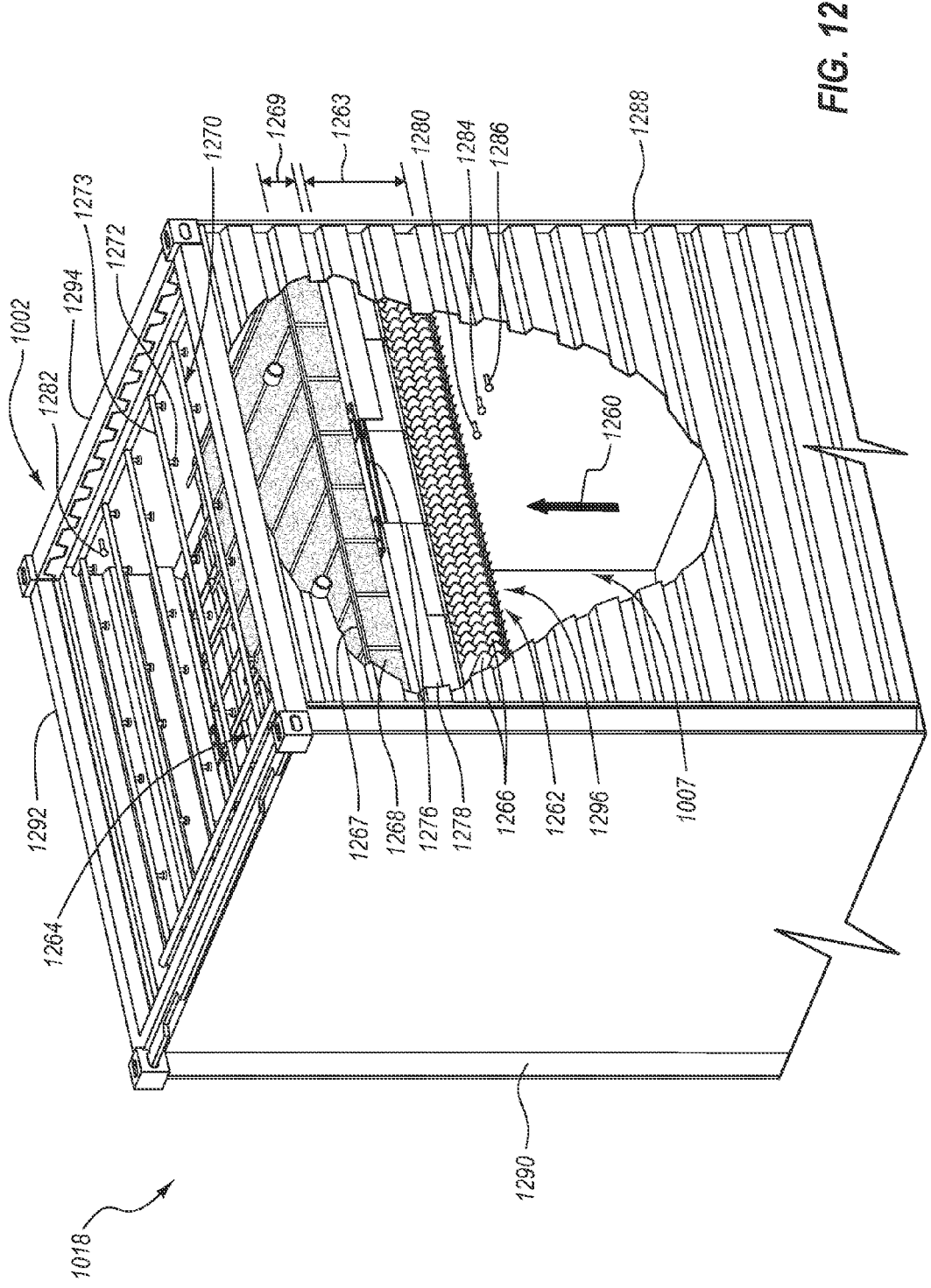
FIG. 12 is a cutaway perspective view of a second portion of the evaporation system shown in FIG. 10.

Wastewater treatment system 100A may also include a control unit 136 housing electrical components configured to control any of the components of system 100A. In one embodiment, control unit 136 includes hardware and/or software for operating one or more of fans, pumps, valves, motors, turbines, sensors, and the like to maintain and/or change the state of system 100A. In one embodiment, control unit 136 includes CPU 920 and software that monitors the state of the system through sensors 922 (FIG. 8), fluid level sensor 630 (FIG. 5), and or sensors 1280, 1282, 1284, 1286 (FIG. 12). The software may include computer executable instructions configured to change the state of equipment in the system to maintain the system within one or more operating parameters. For example, generator 924A, thermal oxidizer 114, and/or furnace 514A may be operated alone or in combination with a fan or other blower to maintain the temperature and/or humidity of the air flow in evaporation system 210A with a desired range.

Generator 924A can be sized and configured to produce a desired amount of heat for evaporation system 210A and/or to generate a desired amount of electrical power. As discussed above, in one embodiment, the electrical generator can be sized and configured to provide sufficient power for running the electrical systems of system 100A, including the control unit 136. This arrangement can be advantageous where the well source 212 is not near a power transmission line. In this embodiment, additional heat sources (e.g., thermal oxidizer, gas furnace, etc.) may be needed to provide sufficient heat for evaporation system 210A.

Alternatively, or in addition, one or more generators 924A can be configured to generate excess power for a grid, in which case, the power generation can greatly exceed the power needs of system 100A and the heat value of the exhaust can provide a substantial percentage and/or all of the heat in water evaporation system 210A. In one embodiment, one or more generators 924A used in system 100 have a total power output in a range from about 250 kW to about 20 MW, more specifically in a range from about 1 MW to about 15 MW, and even more specifically in a range from about 2 MW to about 10 MW. In an alternative embodiment, one or more generators can be sized to produce an exhaust coupled to the evaporation system 210A and providing at least about 30% to about 100% of the total heat input to evaporation system 210A, more specifically about 50% to about 70%.

Generator 924A may be gas powered or liquid fuel powered. However, gas powered is often advantageous at remote wells where petroleum distillates are difficult to obtain. Where a gas generator is used, the gas may be purified, partially purified, or unpurified (e.g., pipeline quality gas or not). Pipeline quality gas can be provided by conditioning the gas from well source using techniques known in the art. In a preferred embodiment, the gas used for generator 924A is only partially purified or unpurified.

Advantageously the systems and methods of the invention can employ a contaminated gas source (i.e., gas that is not pipeline quality). This can be made possible by delivering the exhaust from combustion into evaporation system 210A. Contaminates contained in the exhaust gas may be scrubbed by the moisture in evaporation system 210A and disposed of with concentrated waste 126 as described more fully below with respect to the evaporator systems. In one embodiment, the gas stream used for generator 924A can even include contaminants such as hydrogen sulfide where the contaminant has a concentration that prevents the use of the gas in residential gas pipelines and/or prevents its use in a combustion engine where the exhaust from combustion would fail environmental regulations. Gas that is contaminated with contaminates such as hydrogen sulfide and/or other impurities is often very inexpensive compared to pipeline quality gas due to the cost of gas conditioning to achieve the desired purity. In one embodiment, the gas employed in the generator 924A is not pipeline quality gas. For example, in one embodiment, the gas employed in generator 924A may not fulfill the requirements of 40 CFR §72.2 of the 1999 revisions to 40 CFR Parts 72 and 75. In one embodiment, the gas employed in generator 924A may include less than 70% methane by volume and/or include hydrogen sulfide content greater than 0.3 grams/100 scf or greater than 1.0 grams/100 scf.

Wastewater treatment system 100A may advantageously be constructed and or operated at a remote location. Because well source 212 is typically a natural oil or gas reserve, the location of well source 212 is dictated by geography rather than convenience. In many cases, well source 212 may be a substantial distance from a gas pipeline or a gas conditioning facility. The use of waste heat from the combustion of gas at a remote location can provide a synergistic benefit to reducing the cost of disposing of wastewater produced from a well source. The synergy from power generation and wastewater treatment near the well source arises from the shipping costs associated with transporting the wastewater and the transportation costs associated with transporting a gas in a pipeline to an alternative location. By producing the power near the well head, the costs of cleaning and/or transporting the gas can be avoided with impunity and/or the waste heat from the generation can be economically put to use in treating the wastewater from the well source. In addition, since the wastewater evaporation system 210 is configured to concentrate impurities, the exhaust from generator 924 (or thermal oxidizer 114) can be easily "scrubbed" as it is used to heat the wastewater. Even where the exhaust has relatively high concentrations of impurities, the exhaust is "scrubbed" of its impurities as it travels through evaporating system 210. Thus the combination of power generation and wastewater treatment synergistically benefits each other with little or no additional expense. While using impure gas to operate generator 924A may be advantageous in some embodiments, the us of impure gas is not required. In some cases using higher quality gas (e.g., pipeline quality gas) may be advantageous (e.g., to reduce wear and tear on generator 924A).

The use of generator 924A may be particularly advantageous for wells that are sufficiently far from a gas pipeline that gas transportation costs are an issue. In this embodiment, power can be placed on a grid without having to set up a long distance delivery system for gas. In this embodiment, the use of pipeline quality gas may be economical since the power generation also produces a waste heat that can be used in evaporation system 210A.

Figure 10:
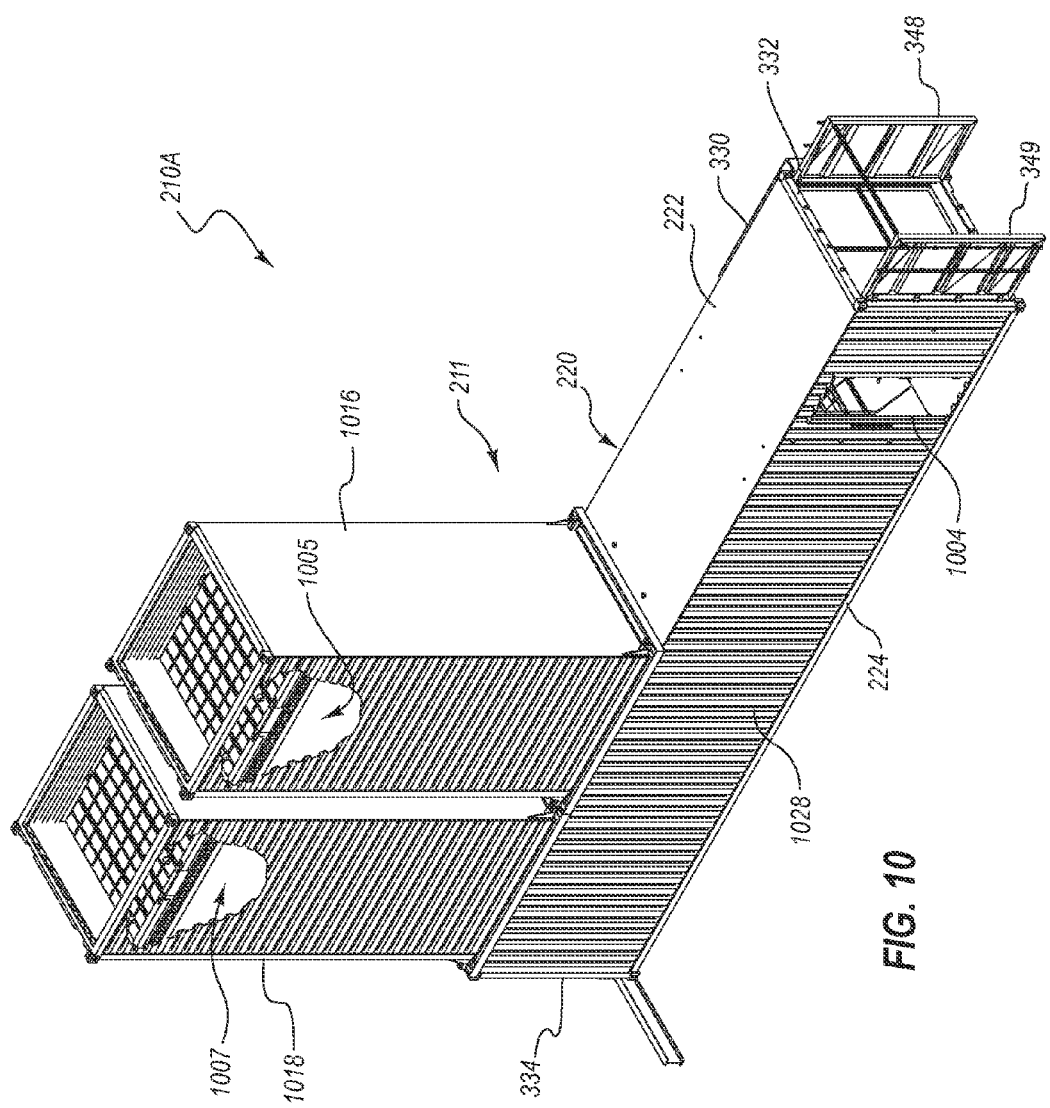
FIG. 10 is a perspective view of an alternative embodiment of a water evaporation system.
Figure 11:
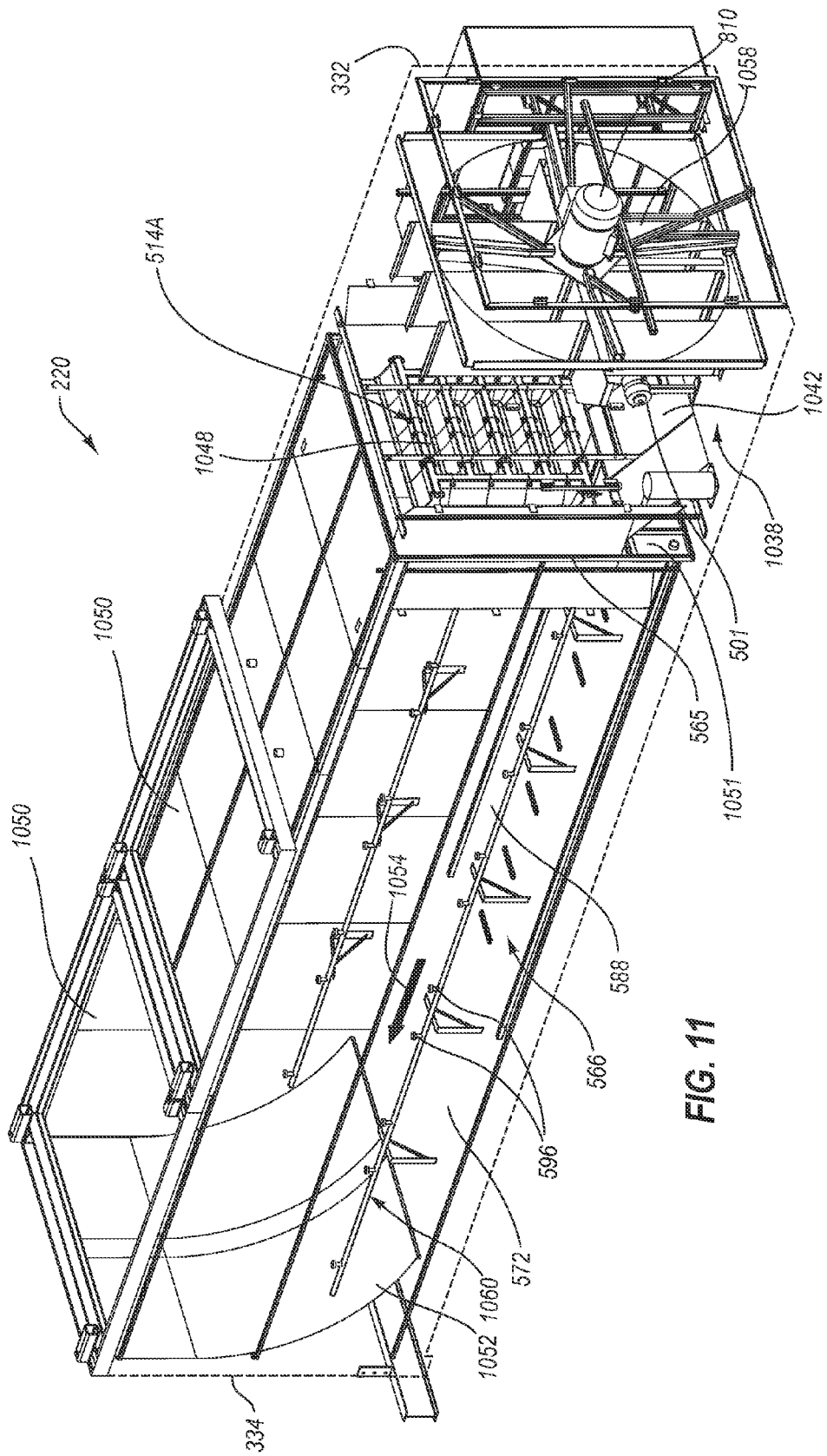
FIG. 11 is a cutaway perspective view of a first portion of the evaporation system shown in FIG. 10.

FIGS. 10-12 illustrate water evaporation system 210A which is an alternative to and can be used in place of water evaporation system 210. Like elements between system 210 and 210A are identified by like reference characters. Water evaporation system 210A comprises a housing assembly 211 that includes an evaporator housing 220 and exit stacks 1016 and 1018. In alternative embodiments, housing assembly can include additional compartments or chambers for storing and/or evaporating wastewater.

Evaporator housing 220 has a substantially flat roof 222 and an opposing floor 224 that each extend between a first end and an opposing second end. An encircling sidewall includes a first sidewall 228 and an opposing second sidewall 330 that each extend between first end 1032 and an opposing second end 1034. Housing 220 bounds an evaporation chamber 588. First end 1032 may be open to ambient air or a source of forced air and may include doors 348 and 349. An opening 1004 can provide a doorway that allows entry into mechanical room 1038 near end 1032.

Housing assembly 211 further includes a plurality of tubular exit stacks 1016 and 1018. Exit stacks 1016 and 1018 have an internal passageway 1005 and 1007, respectively, that is in fluid communication with the evaporation chamber 588 (FIG. 11) of housing 220. Exit stacks 1016 and 1018 can have any shape or size suitable for handling the desired volume of air flowing through evaporation system 210A. Exit stacks 1016 and 1018 can also be combined into a single stack or split into three or more stacks. In one embodiment, exit stacks 1016 and 1018 are modular such that they can be attached and detached from roof 222 of housing 220. Modular stacks can be advantages when a transportable system 210A is desired, although modularity is not required. Exit stacks 1016 and 1018 may include a demisting system described in more detail below with respect to FIG. 12.

Turning now to FIG. 11, in the embodiment depicted, an evaporation chamber 588 is separated from a mechanical room 1038 by partition wall 556. The bottom portion of evaporation chamber 588 serves as fluid reservoir 572 for receiving wastewater from pretreatment system 116 and/or raw wastewater stream 106. Fluid reservoir 572 provides a location for pumping water and for temporary storage for salts and minerals as water is evaporated from fluid reservoir 572. Typically water is evaporated until the salts and/or minerals in fluid reservoir 572 become a concentrated waste stream such as, but not limited to, a slurry. The concentrated waste or a portion thereof may then be removed in batch or as a continuous process. Additional wastewater is added to the reservoir by directly pumping into the reservoir or through misting system 1060, described below.

Partition wall 556 includes a lower divider 1051 that is water tight to prevent fluid in fluid reservoir 572 from flowing into mechanical room 1038. An upper portion of partition wall 565 bounds one embodiment of furnace 514A having slits 1048 that allow air to pass through and enter evaporation chamber 588. The slits 1048 provide an inlet for outside air to enter evaporation chamber 588 above fluid reservoir 572 and create an air flow path 574. Air flow path 574 extends horizontally within evaporation chamber 588 between slits 1048 and openings 1050, which lead to exit stacks 1016 and 1018. A curved air guide panel 1052 may be provided inside evaporation chamber 588 below opening 1050 to direct the airflow up into exit stacks 1016 and 1018. Panel 1052 is not essential, but can improve the efficiency of the system. A second air flow guide panel 1042 can be provided in mechanical room 1038 to direct air into slits 1048 to improve the efficiency of airflow into furnace 514A.

Air flow path 574 may be produced in whole or in part by one or more blowers configured to force air into and/or pull air out of evaporation chamber 588. The blower can be any device configured to create air flow. In one embodiment, the blower used to produce air flow in path 574 may be a fan, an electrical generator, a thermal oxidizer, a gas powered furnace, as discussed above, and/or the like. The embodiment shown in FIG. 11, includes a fan 1056. Fan 1056 can draw in outside air and/or exhaust from one or more combustion devices and/or thermal oxidation processes and force the air into evaporation chamber 588 by passing through furnace 514A. In alternative embodiments, fan 1056 may be placed inside evaporator room 1038 and/or within exit chambers 1016 and/or 1018.

As described above with respect to FIG. 9, water evaporation system 210A can be coupled to one or more heat sources, such as, but not limited to, a thermal oxidizer 114, the generator 924, or a gas furnace 514. The heat source can serve as a blower (e.g., a forced exhaust stream) or provide a flame or other non-forced form of heat. In either case, the source of heat is blown into evaporator evaporation chamber 588. The exhaust or heat can be ported through end 1032, room 1038, or evaporation chamber 588. In one embodiment, exhaust from a thermal oxidizer is drawn into the evaporator through fan 1056 and furnace 514A provides additional heat through the combustion of natural gas and the exhaust from an electric generator is piped into evaporation chamber 588 downstream from partition wall 565. Exhaust from the generator is typically introduced downstream from a gas powered furnace since exhaust from the generator can be substantially depleted of oxygen and could therefore reduce the efficiency of the furnace. Efficient distribution of airflow through furnace 514A may also be achieved by utilizing a plurality of dividers (e.g., divider 1058) that partition air blown by fan 1056. While furnace 514A is shown positioned within partition wall 565, furnace 514A and/or additional or alternative heaters may be positioned upstream from partition wall 565 and/or fan 1056 or downstream of partition wall 565.

The source of the forced air and the type of forced air may be selected to provide a desired level of efficiency and to recoup waste heat produced from ancillary systems to the evaporation system 210A. As shown and discussed above with respect to FIG. 9, wastewater treatment system 100A may include one or more of several different sources heat, including but not limited to, a gas powered furnace 514, a thermal oxidizer 114 and/or the generator 924. Each of these three sources of heat and any other heat source may be used alone or in combination to produce a desired amount of heat and/or forced air for evaporating water within evaporation chamber 588. In one embodiment, the temperature of air flowing into evaporator evaporation chamber 588 is in a range from about 15° C. to about 100° C., more preferably about 35° C. to about 50° C. The volume of airflow may be in a range from about 10,000 cubic feet per minute (cfm) to about 500,000 cfm, more typically about 40,000 cfm to about 100,000 cfm, or about 50,000 cfm to about 70,000 cfm.

To increase the evaporation of water from fluid reservoir 572, evaporator 210 can include a misting system 1060. Misting system 1060 may include a plurality of spray nozzles (e.g., nozzles 596) piping 588, and pump 501 as previously discussed with regard to water evaporation system 210. Misting system 1060 produces a fine mist of wastewater that increases the rate of evaporation of wastewater into air flow path 574 as described above with respect to the discussion of nozzles 596. Misting system 1060 can include any number and/or sizes of conduit and/or nozzles configured to spray wastewater into the air above fluid reservoir 572. Additional details regarding spray nozzles can be found in co-pending patent application Ser. No. 12/029,377, filed Feb. 11, 2008, which is hereby incorporated herein by reference.

Figure 13:
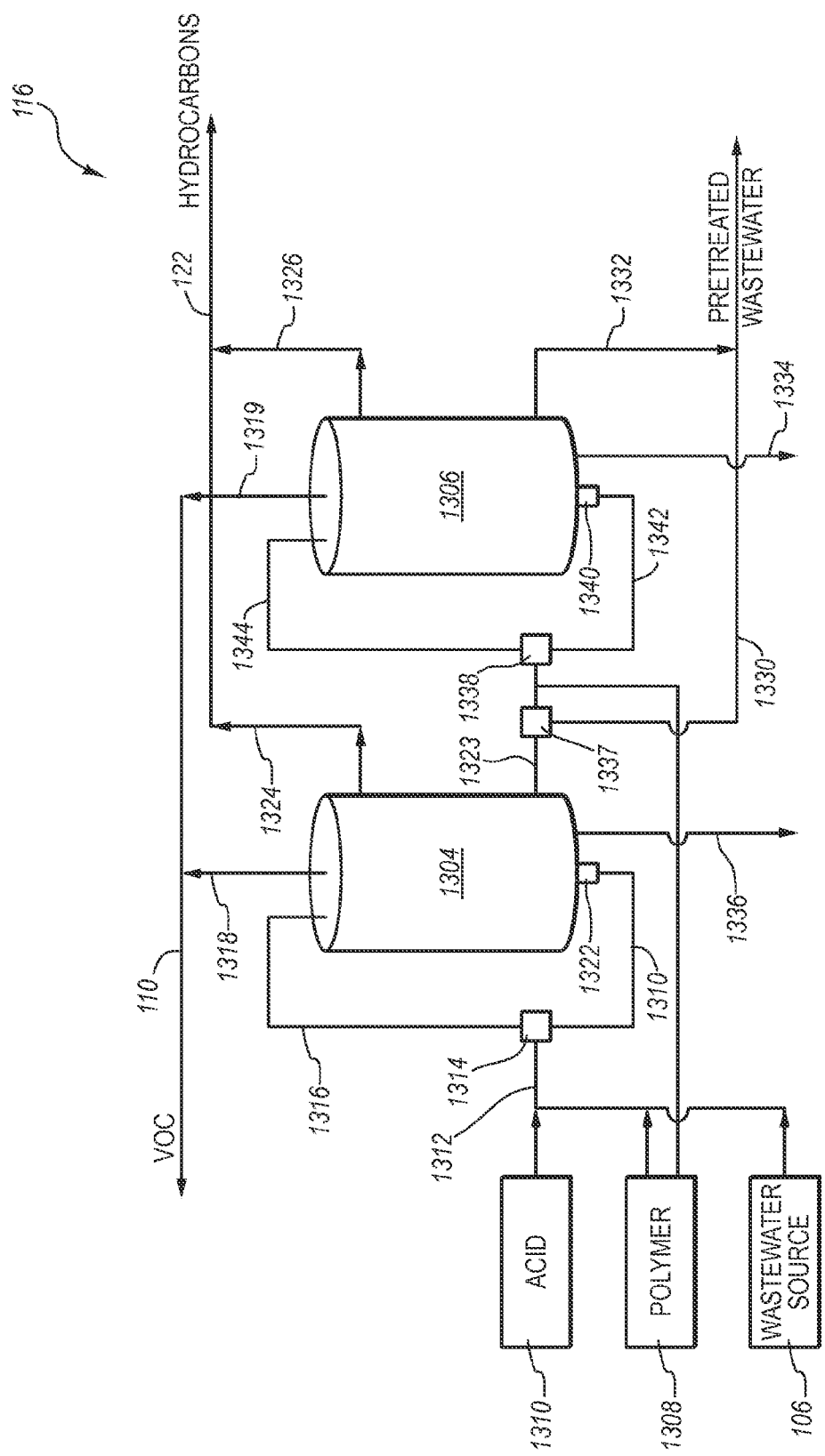
FIG. 13 is an embodiment of a pretreatment system of the wastewater treatment system shown in FIG. 1.

In a preferred embodiment, wastewater introduced into fluid reservoir 572 is treated to inhibit scaling. In a preferred embodiment, the descaling treatment is carried out without softening the water. The descaling treatment can include lowering the pH, applying crystal forming inhibitors, and/or scaling inhibitors. In one embodiment, fluid reservoir 572 has a pH less than about 7, more specifically in a range from about 4.5 to about 6.5, and even more specifically in a range from about 5 to about 6. Adjusting the pH of the wastewater to a pH lower than about 7 inhibits precipitation of salts and other minerals on the sidewalls and other surfaces within evaporation chamber 588. The pH of the wastewater stream can be adjusted by adding a strong acid such as hydrochloric acid, sulfuric acid, and/or phosphoric acid. The acid can be added into the wastewater within the evaporator or prior to the evaporator. As described more fully below with regard to FIG. 13, acid is preferably added in pretreatment system 116. However, the use of acid in pretreatment system 116 is not required. Crystal forming inhibitors and/or scaling inhibitors can be added in or upstream from reservoir 572. Unlike existing wastewater treatment systems that use high pressure, evaporation system 210 has been found to work well without using expensive, traditional water softening techniques (e.g., removing calcium and magnesium using a counter ion such as sodium carbonate or ion exchange). Evaporation system 210 can be operated efficiently without removing the scaling minerals by adjusting the pH and/or adding scaling and/or crystal forming inhibitors. It is believed that system 210 can be operated efficiently without water softening due to its ability to operate at low or even ambient pressures.

FIG. 12 describes exit stack 1018 in greater detail. Exit stack 1018 is formed from sidewalls 1288, 1290, 1292, 1294 that encircle passageway 1007. During use, an airstream 1260 within passageway 1007 delivers air received from evaporation chamber 588 (i.e., air from air flow path 574) toward outlet 1002 where the moisture laden air may be received in the open environment. Air travelling through passageway 1260 is forced through a demister 1296, which includes one or more water coalescing pads (e.g., pads 1262 and 1268). The demister 1296 can include any number of water coalescing pads appropriate for removing suspended moisture of a desired size from air stream 1260. The water coalescing pads of the demister are configured to provide a large surface area in which the air stream 1260 passes to reach outlet 1002 of housing assembly 211. In one embodiment, the average surface area of the one or more pads may be in a range from about 100 $m^2/m^3$ to about 500 $m^2/m^3$, more typically in a range from about 50 $m^2/m^3$ to about 250 $m^2/m^3$. The thickness of the one or more water coalescing pads depends on the configuration of the surface area, the number of different sized water coalescing pads, and the desired water removal to be achieved. However, the thickness will typically be in a range from about 50 mm to about 1500 mm, more specifically about 150 mm to about 500 mm.

The demister typically includes a pattern of walls and channels that allow air to flow therethrough but that cause suspended water droplets to collide and coalesce to form larger water droplets that are heavy enough to fall downward through airstream 1260, which is flowing upward. In alternative embodiments airstream 1260 can flow horizontally or at other angles so long as the collected water can be separated from the evaporated water in airstream 1260.

The size and configuration of the surfaces in the demister and the thickness of the demister (i.e., the length of the flow path through the demister) determines the size and percentage of the water droplets that will coalesce. In general, a longer flow path (i.e., thicker demister) results in a high percentage of a given size water droplet being coalesced and narrower channels and/or thinner wire surfaces results in smaller droplets being coalesced.

FIG. 12 illustrates demister 1296 having a first water coalescing pad 1262 and a second water coalescing pad 1268. Pad 1262 is configured to remove relatively large water droplets from airstream 1260 and second coalescing pad 1268 is configured to remove relatively finer water droplets from stream airstream 1260.

First coalescing pad 1262 includes a plurality of wall structures that define channels through which air stream 1260 is forced to flow over. Wall structures 1266 can have any shape suitable for directing airflow. For example, as shown in FIG. 12, wall structures 1266 can be arranged to form vanes that are stacked in layers and in fluid communication to cause airflow to travel horizontally and vertically through pad 1262. In one embodiment, wall structures 1266 can be placed at angles to create a chevron cross-section. In yet another embodiment, water coalescing pad 1262 can be a layer of regular or irregular shaped structures such as packing materials. Examples of packing material include structured grid packing and random packing materials.

The structure of first coalescing pad 1262, which includes wall structures 1266, is configured to remove water droplets of a particular size. For example, the dimensions and spacing of the wall structures 1266 can be configured to remove water droplets with a diameter of about 20 microns to 100 microns or larger. Water coalescing pads having wall structures are typically useful for removing relatively larger water droplets as compared to a wire mesh pad (e.g., water coalescing pad 1268, described below). In one embodiment, the water coalescing pad 1262 has wall structures 1266 with a thickness in a range from about 0.5 mm to about 5 mm and spacing in a range from about 2 mm to about 50 mm, more specifically about 9.5 mm (3/8 inch) to about 12.7 mm (1/2 inch). In one embodiment, the wall structures 1266 are configured to coalesce water droplets with a diameter in a range from about 20 microns to about 100 microns. The coalescing pad 1262 can include any number of layers of wall structures 1266. The thickness 1263 of coalescing pad 1262 is typically between about 100 mm and 1000 mm, more typically between about 200 mm and 500 mm.

Second water coalescing pad 1268 shown in FIG. 12 is formed from a wire mesh. The wire mesh is generally formed from a metal, but can be made from other materials suitable for making meshes with the desired surface area. The thin wires of the mesh of coalescing pad 1268 provide a desired surface area for water droplets to collect and collide with one another. In general, thinner gauge wire is more effective at removing smaller sized water droplets and thicker wire is more effective at removing relatively larger water droplets. In one embodiment the average thickness of the wire can be in a range from about 0.05 mm to about 1 mm, more typically in a range from about 0.2 mm to about 0.5 mm. In one embodiment, the size and configuration of the wire mesh in coalescing pad 1268 may be configured to remove water droplets from airstream 1260 that have a diameter in a range from about 0.5 microns to about 50 microns, more typically about 1 micron to about 20 microns.

The wire mesh of coalescing pad 1268 is typically woven together, although other methods of interconnecting and/or linking the wires may be used. In one embodiment, coalescing pad 1268 includes a plurality of layers of wire mesh. For example, coalescing pad 1268 can include 50-200 layers of woven wire. Moreover, coalescing pad can have layers with different sized wires and/or spacing. For example, in one embodiment, an upstream portion of the coalescing pad 1268 can have a first coarser wire and/or lower surface area and a downstream portion can have a finer wire diameter and/or higher surface area. The thickness 1269 of coalescing pad may be in a range from about 100 mm to about 1000 mm, more typically between about 150 mm and 500 mm.

Examples of suitable coalescing pad that can be used in demisters according to some embodiments of the invention are sold by Amistco Separation Products, Inc. located in Alvin Tex., USA.

The exit stacks 1016 and 1018 preferably include a wetting system 1270 configured to keep a downstream surface 1267 of demister 1296 wet. Any hardware suitable for applying a liquid such as clean water or wastewater to the downstream surface 1267 may be used. In one embodiment, wetting system 1270 include a plurality of conduits (e.g., conduit 1273) that traverse exit stack 1018 near outlet 1002 above demister 1296. The plurality of conduits 1294 each include a plurality of sprayers 1272, such as sprinklers, misters, nozzles, drip lines or other suitable type of water distribution apparatus. The sprayers 1272 are configured to spray the surface area with sufficient water to maintain a wet surface. Wetting system 1270 can be coupled to a water supply using valves, pumps, conduits and other techniques known in the art. In one embodiment, the wetting system 1270 uses wastewater as the water source.

In operation, the sprayers 1272 can be operated continuously and/or at timed intervals and/or at desired flow rates to maintain a desired wetness. In one embodiment, wetting system 1270 is operated periodically to provide periodic water flow into exit stack 1018, while minimizing the extent to which the water flow impedes airstream 1260 through demister 1296. In one embodiment, the interval for wetting surface 1267 is at least about every hour, more specifically at least about every half hour, and even more specifically at least about every fifteen minutes.

Surprisingly, maintaining a wet surface on the demisters can, in many circumstances, substantially impede the escape of salts and dissolved minerals from the evaporator evaporation system 210A without undo restriction on airstream 1260. Using a wetting system 1270 allows the airstream 1260 to carry a higher concentration of water without losing salts at the interface between the demister and the ambient air. Wetting the surface dissolves salt and/or minerals that would otherwise collect on the surface of the demister and gravity can draw the water back into the airstream 1260, where concentrated salts will fall back down into fluid reservoir 572. The use of wastewater to wet the surface of the demisters may also be advantageous because a portion of the water will be evaporated into the ambient air, which further increases the evaporation efficiency of the system.

Demister 1296 can have any shape suitable for placement in exit stack 1018 so long as airflow can be directed through demister 1296. To facilitate flow of the air stream 1260 through demister 1296, the demister can include brackets and expansion hardware that allows the pads 1262 and 1268 to expand and contract without forming gaps between the walls of exit stack 1018 and demister 1296. FIG. 12 shows plate 1264 with casing hardware 1278 and expansion hardware 1276. Expansion hardware 1276 allows plate 1264 to expand or contract while still directing airflow through the plates of demister 1296.

The demister 1296 is useful for preventing dissolved salts and minerals from escaping the evaporator system. Water that has been suspended in airstream 1260, but not evaporated, typically contains salts and/or minerals. Water that is actually evaporated (i.e. gaseous) contains very little if any dissolved salts. By retaining water vapor within the evaporator system, the salts and minerals can be more efficiently concentrated and properly disposed of.

The proper air flow and temperature within exit stack 1018 can be maintained using one or more sensors. Evaporation system 210A may include temperature sensors, humidity sensors, pressure sensors, mass air flow sensors and the like either inside or outside the airflow stream (i.e., inside or outside the system). FIG. 12 illustrates pressure sensors 1280 and 1282, which can be used to determine a pressure drop across demister 1296. Humidity sensor 1284 and temperature sensor 1286 may be used alone or in combination with pressure sensors 1280 and 1282 to determine proper flow and water capacity of airstream 1260. The air flow and temperature within exit stack 1018 can be controlled using control unit 136, which can use the readout from sensors 1080, 1082, 1084, 1086 and/or sensors 922, to change the state of system 210A.

The present invention also includes methods for evaporating a fluid. In one embodiment, the methods can include all or a portion of the following steps: (i) pooling a fluid within a reservoir that is bounded by an elongated housing, the housing also bounding an air flow path that is disposed over top of and that communicates with the reservoir, the air flow path extending from an air inlet opening in the housing to an air outlet opening in the housing; (ii) creating a flowing air stream wherein air in the environment outside of the housing flows into the air flow path through the air inlet opening, travels along the air flow path so that the air passes over the fluid within the reservoir, and then exits out of the housing through the air outlet opening; (iii) spraying the fluid within the reservoir into the air flow path within the housing and above the reservoir; and (iv) coalescing suspended water droplets in the air stream on a demister upstream from the air outlet opening and downstream from the reservoir, the demister including at least one water coalescing pad configured to coalesce suspended water droplets in the air stream. In one embodiment, the method the step of coalescing suspended water droplets includes removing at least about 50% by weight of water droplets in the air flow stream having a size between about 1 micron and about 20 microns in diameter. More specifically, at least about 80%, 90%, or even at least about 99% of water droplets having a size between about 1 micron and about 20 microns in diameter are removed. Alternatively, or in addition, the method may include the step of coalescing at least about 50% by weight of water droplets in the air flow stream having a size between about 20 micron and about 100 microns. More specifically, at least about 80%, 90%, or even at least about 99% of water droplets having a diameter of about 20 microns to about 100 microns are removed.

The method can also include wetting a downstream surface of the demister. The wetting may be carried out continuously or intermittently. For example, the surface can be wetted at intervals of less than about 1 hour, more specifically at intervals of less than about 0.5 hour, and even more specifically at intervals of less than about 0.25 hour. The method may also include generating electrical power using an electrical generator to produce an exhaust stream; supplying the electrical power to a power grid and/or powering a control unit configured to operate the electrical generator; and using the exhaust stream to create at least a portion of the flowing air stream. In one embodiment, the method can also include regulating the speed of the flowing air stream based on the temperature or humidity within or outside of the housing. This step can be carried out using a control unit and one or more sensors inside and/or outside the housing. This step can be carried out using a control unit and one or more sensors inside and/or outside the housing. The method can also be carried out using any of the features described above with regard to FIGS. 1-12 or with regard to the pretreatment system described more fully below.

As mentioned above, the present invention includes systems and methods wherein the well source is a brackish water such as sea water. In this embodiment, the desired product from the systems and methods may be a desalinated water condensed from the airflow stream downstream from the demisters. The evaporated water in airstream 1260 can be condensed downstream from demister 1296 and recovered to produce a desalinated water. The desalinated water may be potable water or an irrigation water. Where potable water is desired, the heat source for evaporation system 210A typically includes a furnace and the exhaust heat from the combustion of highly polluting materials is typically avoided.

The hot moist air exiting evaporator evaporation system 210A at opening 1002 can be directed to any condenser known in the art for condensing evaporated moisture from a humid air supply. For example, moisture can be cooled using a heat exchanger that cools the purified evaporated stream exiting evaporator evaporation system 210A using ambient air and/or a coolant such as water, including sea water. Those skilled in the art are readily familiar with condensers that can be used to produce condensed water from a high moisture content stream such as airstream 1260 downstream from demister 1296. Moreover, those skilled in the art are familiar with systems including pumps, valves, storage tanks, etc. that are useful for handing the desalinated water to obtain it from the ground or a body of water and/or for injecting concentrated water back into the environment. Additional details regarding condensers and systems for drawing brackish water from the natural environment can be found in US Patent Publication No. 2007/0084778 to St. Germain and US Patent Publication No. 2002/0178723 to Bronicki, which are both hereby incorporated herein by reference.

Figure 9:
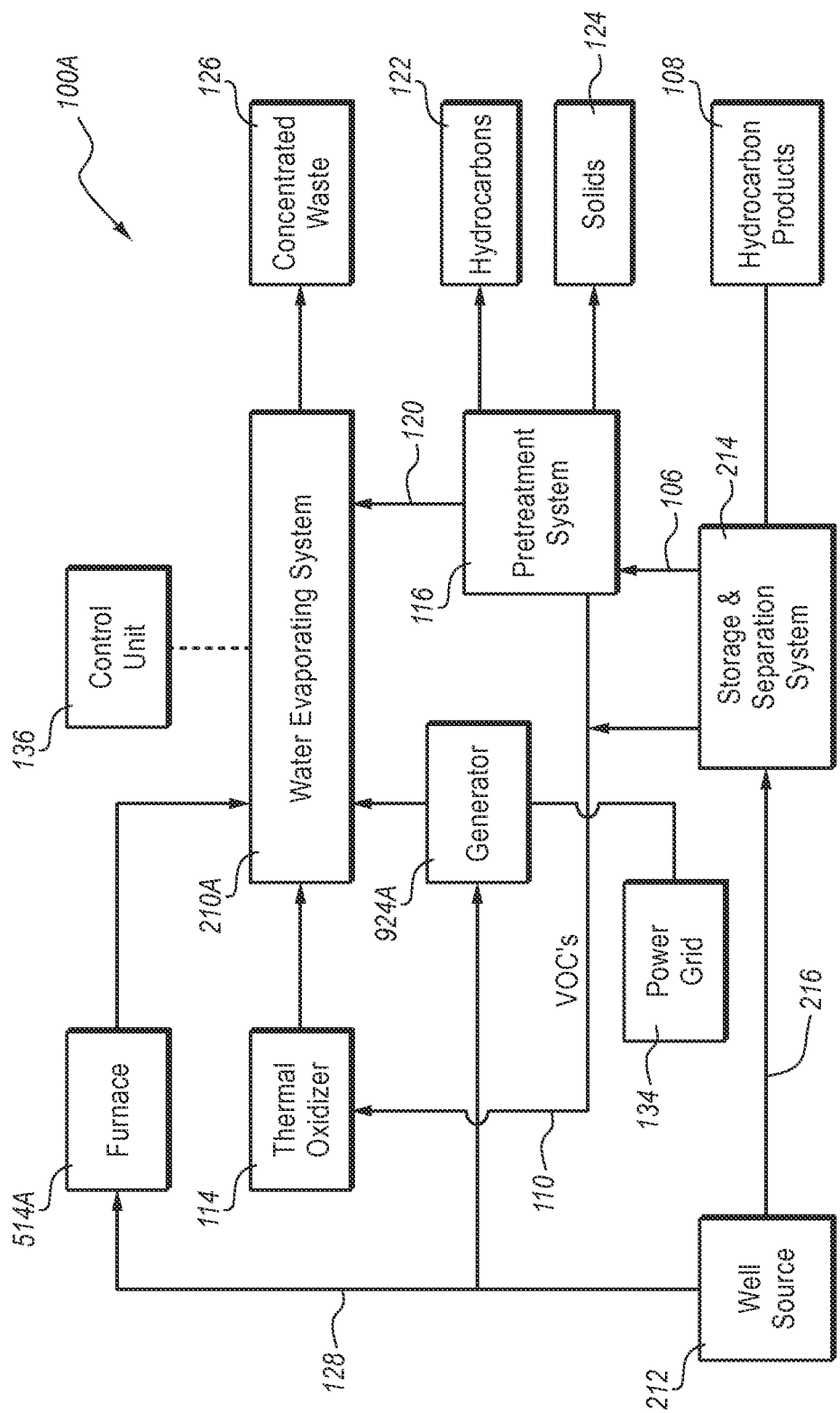
FIG. 9 is a schematic of a wastewater treatment system according to an alternative embodiment of the invention.

FIGS. 13-16 illustrate one example of a pretreatment system 116 that can be used in wastewater treatment system 100A shown in FIG. 9. Pretreatment system 116 includes one or more upflow induced air separators such as separators 1304 and 1306. Pretreatment system 116 is configured to separate solids, water, dissolved hydrocarbons, and gaseous compounds into separate streams. Pretreatment system 116 includes a wastewater stream 106 produced from an oil and gas source and therefore includes components typically found in the wastewater produced from a well source as described above.

The wastewater stream 106 is treated with polymer 1308 and optionally acid 1310 to form conditioned wastewater stream 1312, which is then delivered to gas induction apparatus 1314. Gas induction apparatus 1314 mixes a gas into stream 1312 to form induction stream 1310. Induction stream 1310 is injected into upflow separator 1304 via inlet 1322. Upflow separator 1304 separates the wastewater stream into a recycle gas stream 1316, volatile organic compounds 1318, a foam stream 1324, a pretreated wastewater stream 1323, and in some cases a solids stream 1336.

In one embodiment, pretreated wastewater stream 1323 can be treated in a second upflow separator 1306 to ensure complete separation. Or, alternatively wastewater stream 1324 can be delivered to water evaporation system 210A via stream 1330. The additional pretreatment of stream 1323 can be selectively controlled by valve 1337. For example, if a certain quantity of solids and/or hydrocarbons remains in stream 1323, valve 1337 can be set to deliver stream 1323 to a second gas induction apparatus 1338 and subsequently to second upflow separator 1306. In an alternative embodiment, pretreatment system can be configured to always deliver stream 1323 to a second upflow separator 1306 or even one or more additional upflow separators to achieve a desired level of separation between the water and hydrocarbons.

The second gas induction apparatus combines stream 1323 with a gas from upflow separator 1306 via line 1344 and/or from ambient air to form a second induction stream 1342, which is then introduced into the second separator 1306 via inlet 1340. A second quantity of polymer 1338 can also be added to stream 1323 to enhance separation of the water and polymer. Second upflow separator 1306 creates a stream 1319 of volatile organic compounds, a foam stream 1326 that includes separated hydrocarbons, a pretreated wastewater stream 1332 and in some cases a second solid waste stream 1334.

The polymer 1308 is added to the wastewater stream 1312 and optionally added to stream 1323 in sufficient quantities to enhance separation of the hydrocarbons and the water fraction of the wastewater. Any polymer can be used that will enhance the interaction of hydrocarbons with the surface of the water. The polymer can be a high or low molecular weight, anionic, or cationic polymer that is water or emulsion soluble. Examples of suitable polymers include polymamines and polyamides (e.g., polyacrylamide). Other flocculents known in the art can be used alone or in combination with the polymer to facilitate separation of the hydrocarbons and the water. The polymer can be continuously metered into the wastewater stream 106 or alternatively a desired quantity can be added in batch to a certain quantity of wastewater to obtain a desired concentration. In one embodiment, the concentration of the polymer in the wastewater is in a range from about 1 parts per million (vol. %) to about 300 parts per thousand (vol. %) more specifically about 2 ppm (vol. %) to about 50 ppm (vol. %), and most preferably about 3 ppm to about 10 ppm. The use of a polymer can have a substantial impact on the separation of hydrocarbons from water. In one embodiment, wastewater departing pretreatment system 116 has a hydrocarbon content less than about 150 ppm, less than about 50 ppm, or even less than about 10 ppm.

An acid may also be metered or batch added to the wastewater stream 1312 to lower the pH. Examples of suitable acids include concentrated hydrochloric acid and concentrated sulfuric acid. Hydrochloric acid may be preferred in some embodiments. The use of an acid to lower the pH of the wastewater stream in combination with the use of a polymer was surprisingly found to increase the separation of hydrocarbons from wastewater in the upflow separator 1304 as compared to polymer alone. However, lowering the pH is not essential for separation in the upflow separator. Moreover, substantial benefits throughout system 100 were observed from adding acid to wastewater stream 106. The use of an acid has been found to substantially reduce buildup of salt and other minerals on the components of system 100, and particularly the components of evaporation system 210 that come into contact with wastewater (including misted wastewater as described above). Thus, while adding acid prior to upflow separator 1304 can be desirable, the addition of acid may also be beneficial in evaporation system 210 or in line between pretreatment system 116 and evaporation system 210. In one embodiment, the acid is added in sufficient quantities to lower the pH to within a range from about 4-7, more specifically about 4.5-6.5, and even more specifically about 5-6. The pH of the wastewater stream can be measured using techniques known in the art (e.g., a pH meter).

FIG. 14 illustrates the upflow separator 1304 in additional detail. Upflow separator includes a vessel 1403 with a riser 1458 disposed therein and a weir wall 1460 positioned above riser 1458. As mentioned, induction stream 1310 is injected into separator 1304 via inlet 1322. The mixture of gasses, polymer, water, hydrocarbons, and solids are forced up through tubing 1454 of riser 1458 and ejected through a plurality of riser outlets 1456, which are sized and configured to cause foaming. Riser outlets 1446 are also referred to herein as injection openings. In one embodiment, riser outlets 1456 have a surface area that collectively are about the same surface area as a horizontal cross-section of riser 1458. By keeping the surface area of the riser outlet openings about as large as the cross-section of riser 1458, the injection of induction stream 1310 will have minimal turbulence, which benefits separation. In one embodiment, the collective surface area of riser outlets 1456 is at least about 0.5 to 2.0 times the surface area of a horizontal cross section of riser 1458. While riser outlets 1456 have been illustrated in this embodiment as being circular, riser outlets can have any shape and/or be combined into a single opening.

The mixture ejected from riser 1458 forms a foam-water mixture that separates based on density into a water fraction 1470, a foam fraction 1468 and a gaseous fraction 1466. Foam fraction 1468 floats above the water fraction 1470 because it is lighter than water. The water fraction 1470 collects near the bottom of vessel 1403. The water level (i.e., the interface between fraction 1470 and 1468) can be maintained by controlling the flow of water out of outlet 1453. If the rate of flow out of outlet 1453 is greater than the accumulation of separated water entering through riser 1458 then the water level rises. Conversely, if the rate of flow out of 1453 is greater than the rate of water accumulation from outlet 1453, the water level drops. The foam fraction 1468 is allowed to accumulate in vessel 1403. The accumulating foam rises above water fraction 1470 until the foam flows over weir wall 1460. Foam flowing over weir wall 1460 flows along a slanted support 1462 and exits vessel 1403 as stream 1324. The top of weir wall 1460 and opening in vessel wall create the opening through which foam flows out of vessel 1403.

Gas fraction 1466 is lighter than foam fraction 1468 and collects in vapor space above weir wall 1460 and exists vessel 1403 as stream 1316 (i.e., gas induction line) or as stream 1318 (i.e., VOCs).

Outlet 1136 can be selectively opened to flush solids that may collect in the bottom of vessel 1403, depending on the presence or absence of solids in wastewater stream 106. One or more sprayers (e.g., sprayers 1450 and 1452) can be provided to facilitate flushing vessel 1403.

The use of polymer and optionally acid enhances the degree and/or rate to which hydrocarbons are separated in vessel 1403. Because foam fraction 1468 has a high surface area, the polymer in the foam is able to better attract hydrocarbons than polymer in the water fraction 1470. This feature can result in rapid separation of the hydrocarbons from the water fraction. This feature results in much higher throughput of material for a given volume of vessel 1403, thereby reducing capital costs and reducing the number of successive upflow separators needed to sufficiently treat the wastewater stream. In some embodiments, sufficient separation can be achieved with a single separation vessel or just two separation vessels, although more than one or two upflow separators can be used depending on the circumstances of the wastewater stream.

In one embodiment, upflow separator 1304 may be efficiently operated by periodically purging foam fraction 1468. Periodically purging foam fraction 1468 prevents vessel 1403 from becoming clogged and improves the separation of gases, solids, water, and foam. To purge foam fraction 1468, water flow through outlet 1453 can be halted or reduced to allow the water level to rise. FIG. 15 illustrates a purge procedure in which the water level has flowed over weir wall 1460 and out vessel 1403 through line 1324. Foam fraction can be substantially purged by opening an alternative opening (not shown) other than line 1324 and/or by limiting the amount of water that is allowed to flow out line 1324. In one embodiment, purging foam fraction 1468 can be carried out on a regular period basis as a preventative measure. In one embodiment, foam purging is carried out at least daily during operation, more specifically at least hourly, even more specifically at least about every 30 minutes, and even more preferably at least about every 15 minutes during operation.

In some cases, solids such as small rocks, dirt, and/or sand can accompany the wastewater stream and may collect in the bottom of reactor 1403. FIG. 16 illustrates an upflow separator that has been operated for a sufficient period of time for a solid fraction 1472 to collect on the bottom of vessel 1403. Solids fraction 1472 may be purged by opening a valve to allow solid fraction 1472 to flow through outlet 1336. To facilitate cleaning of vessel 1403, a plurality of sprayers (e.g., sprayers 1450 and 1452) may be operated during the purging of solids fraction 1472. Solids fraction 1472 can be purged for any amount of time sufficient to remove the desired portion. In some embodiments, water level in the vessel 1403 can drop during the solids purging step. The frequency with which solids purging is carried out will depend on the source of the wastewater stream. However, in one embodiment purging the solids fraction can be carried out at least about monthly, more specifically at least about weekly, and even more specifically at least about daily.

Additional details regarding upflow separator systems that can be used in the present invention include, but are not limited to the features of the upflow separators described in U.S. Pat. No. 4,564,457, which is hereby incorporated herein by reference.

In one embodiment, the invention includes methods for separating oil and gas contaminants from water. In one embodiment, the methods include all or a portion of the following steps: (i) providing an upflow separator apparatus include a vessel defining an internal space having a top end and a bottom end. A riser is positioned within the vessel and is coupled to an inlet thereof and extending upward from the bottom end of the vessel, the riser having one or more injection openings configured to produce a foam from an injection stream; (ii) providing an induction apparatus in fluid communication with the inlet of the vessel and with a wastewater stream; (iii) mixing a polymer with the wastewater stream; (iv) adjusting the pH of the wastewater to less than about 7; (v) inducing gas into the wastewater stream to produce an injection stream; (vi) emitting the injection stream from the injection openings to produce a foam; (vii) allowing the emitted injection stream to separate into a water fraction, a foam fraction, and a gas fraction; (viii) recovering the separated water fraction, foam fraction, and gas fraction; and (ix) introducing the recovered water fraction into a fluid reservoir of a water evaporator, the water evaporator including a housing bounding the fluid reservoir formed at or adjacent to a floor, the housing also bounding an air flow path that is disposed over top of and that communicates with the fluid reservoir; an inlet opening formed at a first location of the housing, the inlet opening being configured to introduce air from outside of the housing into the air flow path; an outlet opening formed at a second location of the housing and communicating with the air flow path, the outlet opening communicating with the open environment outside of the housing; a blower for forcing air into the air flow path and out the outlet opening; and a misting system configured to spray fluid pooled within the reservoir into the air flow path above the fluid reservoir.

The method can employ any of the features described above with respect to the pretreatment system described in FIGS. 13-16 and/or evaporator systems described with respect to FIGS. 1-12.

In view of the foregoing, it is appreciated that different embodiments of the present invention can be used to achieve a number benefits. For example, the water evaporation system can be designed to be transportable. As such, the water evaporation system can be shipped directly to a well head, storage tank, pond, or other site where it is desired to evaporate a fluid such as water. The water evaporation system thus eliminates the need to ship the fluid and eliminates the need to pay for disposal fees at a disposal facility. Once use of the system at one location is completed, the system can then be moved to another location. Likewise, if additional capacity is needed, two or more water evaporation systems can be positioned at a single site. In alternative embodiments, it is appreciated that the water evaporation system need not be transportable but can be built as a fixed structure at a desired location.

Additional benefits of the water evaporation system are that some embodiments can be designed to be self-contained for use in remote locations. Furthermore, because housing 220 is enclosed, the system can be used in high winds and in any other environmental conditions. In some embodiments, depending on whether conditions, it is appreciated that the water evaporation system can be used to evaporate more than 200 barrels of water per day and more commonly more than 300 or 400 barrels of water per day. Although the present invention is primarily discussed with the evaporation of water, it is also understood that the inventive water evaporation system can also be used for the evaporation of other types of fluids.

The present invention may be embodied in other specific forms without departing from its spirit or essential characteristics. For example, it is appreciated that the different features of wastewater treatments systems 100 and 100A and the alternatives thereof can be mixed and matched to form other system configurations. Thus, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for separating oil and gas contaminants from wastewater and concentrating the wastewater stream, comprising:
   providing a first upflow separator apparatus comprising,
      a vessel defining an internal space having a top end and a bottom end; and
      a riser positioned within the vessel and coupled to an inlet thereof and extending upward from the bottom end of the vessel, the riser having one or more injection openings configured to produce a foam from an injection stream;
   providing an induction apparatus in fluid communication with the inlet of the vessel and with a wastewater stream comprising hydrocarbons;
   mixing a polymer with the wastewater stream;
   inducing gas into the wastewater stream to produce an injection stream; and emitting the injection stream from the injection openings to produce a foam within the vessel;

allowing the emitted injection stream to separate into a wastewater fraction, a gas fraction, and a foam fraction comprising hydrocarbons;

recovering the separated wastewater fraction, foam fraction, and gas fraction; and concentrating the waste water in a water evaporation system, wherein the wastewater is concentrated at least in part by misting the wastewater within a housing and forcing an airstream through the misted wastewater to cause evaporation of water therefrom.

2. The method of claim 1, wherein the polymer is comprised of polyamine or a polyamide.

3. The method of claim 1, wherein the concentration of the polymer in the wastewater stream is in a range from about 5 ppm to about 300 ppm by volume.

4. The method of claim 1, further comprising adding an acid to the wastewater to adjust the pH to less than about 7.

5. The method of claim 1, further comprising adding an acid to the wastewater to adjust the pH to within a range from about 4.5-6.5.

6. The method of claim 1 further comprising periodically purging the foam fraction by continuing to emit the injection stream while blocking or partially blocking the release of the water fraction.

7. The method of claim 6, wherein the foam fraction is periodically purged at least about daily.

8. The method of claim 1, further comprising allowing a solid fraction to build up in a bottom portion of the vessel and then discharging at least a portion of the solid fraction.

9. The method of claim 8, further comprising one or more sprayers positioned within the vessel and configured to direct a fluid stream at or near the bottom of the vessel to discharge the at least a portion of the solid fraction.

10. The method of claim 1, further comprising:
providing a second upflow separator apparatus comprising,
  a second vessel defining an internal space having a top end and a bottom end; and
  a second riser positioned within the second vessel and coupled to an inlet thereof and extending upward from the bottom end of the vessel, the riser having one or more injection openings configured to produce a foam from an injection stream;
providing a second induction apparatus in fluid communication with the inlet of the vessel and with a wastewater stream;
receiving the recovered water fraction from the first upflow separator apparatus;
inducing gas into the recovered water fraction to produce a second injection stream; and
emitting the second injection stream from the injection openings to produce a foam;
allowing the emitted second injection stream to separate into a second water fraction, a second foam fraction, and a second gas fraction;
recovering the separated second water fraction, second foam fraction, and second gas fraction.

11. A method for separating oil and gas contaminants from water, comprising:
providing an upflow separator apparatus comprising,
  a vessel defining an internal space having a top end and a bottom end; and
  a riser positioned within the vessel and coupled to an inlet thereof and extending upward from the bottom end of the vessel, the riser having one or more injection openings configured to produce a foam from an injection stream;
providing an induction apparatus in fluid communication with the inlet of the vessel and with a wastewater stream;
mixing a polymer with the wastewater stream;
adjusting the pH of the wastewater to less than about 7;
inducing gas into the wastewater stream to produce an injection stream; and
emitting the injection stream from the injection openings to produce a foam;
allowing the emitted injection stream to separate into a water fraction, a foam fraction, and a gas fraction;
recovering the separated water fraction, foam fraction, and gas fraction; and
introducing the recovered water fraction into a fluid reservoir of a water evaporator, the water evaporator including a housing bounding the fluid reservoir formed at or adjacent to a floor, the housing also bounding an air flow path that is disposed over top of and that communicates with the fluid reservoir;
an inlet opening formed at a first location of the housing, the inlet opening being configured to introduce air from outside of the housing into the air flow path;
an outlet opening formed at a second location of the housing and communicating with the air flow path, the outlet opening communicating with the open environment outside of the housing;
a blower for forcing air into the air flow path and out the outlet opening; and
a misting system configured to spray fluid pooled within the reservoir into the air flow path above the fluid reservoir.

12. The method as in claim 11, further comprising adjusting the pH of the wastewater stream to within a range from about 4.5 to about 6.5.

13. The method as in claim 11, wherein the polymer is comprised of a polyamine and/or a polyamide.

14. The method as in claim 11, wherein the concentration of the polymer in the wastewater stream is in a range from about 5 ppm to about 300 ppm by volume.

15. The method as in claim 11, further comprising a demister positioned downstream from the misting system.

16. The method as in claim 15, further comprising spraying water on the downstream surface of the demister.

* * * * *